(12) United States Patent
Thomas et al.

(10) Patent No.: US 12,226,273 B2
(45) Date of Patent: Feb. 18, 2025

(54) DISPOSABLE DENTAL AEROSOL DEVICE

(71) Applicant: Stoma Ventures, LLC, Chesterfield, MO (US)

(72) Inventors: Charles Thomas, Vero Beach, FL (US); Edward Arguello, Weston, FL (US); Jim Langeloh, Naples, FL (US)

(73) Assignee: STOMA VENTURES, LLC, Chesterfield, MO (US)

( * ) Notice: Subject to any disclaimer, the term of this patent is extended or adjusted under 35 U.S.C. 154(b) by 218 days.

(21) Appl. No.: 17/064,484

(22) Filed: Oct. 6, 2020

(65) Prior Publication Data

US 2021/0338397 A1 Nov. 4, 2021

Related U.S. Application Data

(63) Continuation-in-part of application No. 16/929,537, filed on Jul. 15, 2020, and a continuation-in-part of application No. 16/888,770, filed on May 31, 2020, now Pat. No. 11,278,383, and a continuation-in-part of application No. 16/865,843, filed on May 4, 2020.

(51) Int. Cl.
*A61C 17/10* (2006.01)
*A61C 17/08* (2006.01)

(52) U.S. Cl.
CPC ............. *A61C 17/10* (2019.05); *A61C 17/08* (2019.05)

(58) Field of Classification Search
CPC ......... A61C 17/08; A61C 17/06; A61C 17/10; A61M 1/84; A61M 1/74; A61M 11/00; A61M 15/00; A61M 16/00; A61M 2210/0625; A61B 1/00094; A61B 5/150053; A61B 5/150145; A61B 2017/22079; A61B 2217/005; A61B 2217/007; Y10S 604/902
USPC ........................................... 433/93
See application file for complete search history.

(56) References Cited

U.S. PATENT DOCUMENTS

| 730,128 | A | * | 6/1903 | Jordan | A61C 17/08 |
| | | | | | 433/93 |
| 1,501,010 | A | * | 7/1924 | Dailey | A61C 17/08 |
| | | | | | 433/91 |
| 1,873,160 | A | * | 8/1932 | Sturtevant | A61M 16/0493 |
| | | | | | 128/207.14 |
| 3,090,122 | A | * | 5/1963 | Erickson | A61C 17/08 |
| | | | | | 600/238 |

(Continued)

FOREIGN PATENT DOCUMENTS

| CH | 615342 A5 * | 1/1980 |
| DE | 3939859 A1 * | 6/1991 |

(Continued)

OTHER PUBLICATIONS

Boeters "DE 202019001370 U1 Translated" (Year: 2020).*

(Continued)

*Primary Examiner* — Heidi M Eide
*Assistant Examiner* — Holly T. To
(74) *Attorney, Agent, or Firm* — David H. Chervitz

(57) ABSTRACT

A disposable dental aerosol device has a body having an exterior surface, a front end having an angled opening having a retraction lip portion, a rear end having an opening, and a lumen formed between the front end and the rear end, and a pressure relief opening formed in the exterior surface of the body.

18 Claims, 24 Drawing Sheets

(56) References Cited

U.S. PATENT DOCUMENTS

| | | | | |
|---|---|---|---|---|
| RE26,470 E * | 10/1968 | Deuschle | A61C 17/08 | 433/96 |
| 3,557,456 A * | 1/1971 | Hutchinson | A61C 17/08 | 433/96 |
| 3,645,497 A * | 2/1972 | Nyboer | A61M 1/7413 | 433/95 |
| 3,758,950 A * | 9/1973 | Krouzian | A61C 17/08 | 433/91 |
| 3,825,004 A * | 7/1974 | Durden, III | A61M 1/76 | 606/49 |
| 3,890,712 A * | 6/1975 | Lopez | A61C 17/08 | 433/92 |
| 3,965,901 A * | 6/1976 | Penny | A61M 1/87 | 604/119 |
| 4,002,170 A * | 1/1977 | Hansen | A61M 1/85 | 604/269 |
| 4,522,592 A * | 6/1985 | Johnson | A61C 17/08 | 433/95 |
| 4,767,404 A | 8/1988 | Renton | | |
| 4,883,426 A * | 11/1989 | Ferrer | A61C 17/08 | 433/91 |
| 4,966,551 A * | 10/1990 | Betush | A61C 17/08 | 604/32 |
| 5,078,602 A * | 1/1992 | Honoshofsky | A61C 17/08 | 433/91 |
| 5,114,342 A * | 5/1992 | Young | A61C 17/08 | 433/95 |
| 5,127,411 A | 7/1992 | Schoolman et al. | | |
| 5,165,891 A * | 11/1992 | Young | A61C 17/08 | 251/297 |
| 5,378,150 A | 1/1995 | Harrel | | |
| 5,441,410 A * | 8/1995 | Segerdal | A61C 17/08 | D24/176 |
| 5,513,986 A * | 5/1996 | Feltham | A61C 17/08 | 433/91 |
| 5,738,519 A | 4/1998 | Tenniswood | | |
| 5,817,050 A * | 10/1998 | Klein | A61M 1/84 | 604/35 |
| 6,203,321 B1 * | 3/2001 | Helmer | A61C 17/125 | 433/95 |
| 6,428,316 B1 * | 8/2002 | Rodriquez | A61C 17/065 | 433/92 |
| 7,238,023 B1 * | 7/2007 | Enos | A61C 17/08 | 433/91 |
| D615,198 S * | 5/2010 | Mao | D24/135 | |
| 7,744,371 B1 * | 6/2010 | Griffin | A61C 17/08 | 433/91 |
| 8,297,972 B2 * | 10/2012 | Gordon | A61C 3/00 | 433/140 |
| 9,044,294 B1 * | 6/2015 | Herdocia | A61C 17/08 | |
| D739,005 S | 9/2015 | Matsumura | | |
| 9,532,857 B2 | 1/2017 | Ronto | | |
| 10,524,889 B1 * | 1/2020 | Bordas | A61M 1/7413 | |
| 10,952,831 B1 * | 3/2021 | Dürrstein | A61C 17/096 | |
| 10,959,820 B1 * | 3/2021 | Steele | A61C 17/10 | |
| 11,376,028 B1 * | 7/2022 | Saadat | A61B 17/320758 | |
| 11,490,992 B1 * | 11/2022 | Crosby | A61C 1/14 | |
| 11,678,963 B1 * | 6/2023 | Arguello, Jr. | A61C 17/12 | 433/91 |
| 2003/0017433 A1 * | 1/2003 | Reiz | A61C 17/08 | 433/140 |
| 2003/0124484 A1 | 7/2003 | Reiz | | |
| 2003/0219696 A1 * | 11/2003 | Moreland | A61C 17/08 | 433/91 |
| 2005/0106527 A1 * | 5/2005 | Frider | A61C 17/08 | 433/91 |
| 2005/0250071 A1 * | 11/2005 | Chu | A61C 17/08 | 433/91 |
| 2008/0021488 A1 * | 1/2008 | Berberich | A61B 17/32002 | 606/170 |
| 2009/0136895 A1 * | 5/2009 | Khalaf | A61C 17/08 | 433/91 |
| 2009/0274991 A1 * | 11/2009 | Black | A61C 17/08 | 433/93 |
| 2010/0240005 A1 * | 9/2010 | Gordon | A61C 3/00 | 433/140 |
| 2010/0297577 A1 * | 11/2010 | Cohen | A61M 1/79 | 210/85 |
| 2011/0070556 A1 * | 3/2011 | Haapasalo | A61C 17/08 | 433/92 |
| 2011/0262880 A1 * | 10/2011 | McCary | A61C 17/065 | 210/768 |
| 2013/0059265 A1 * | 3/2013 | Pasha | A61C 17/08 | 433/92 |
| 2013/0288196 A1 * | 10/2013 | Gordon | A61C 17/08 | 433/140 |
| 2014/0212841 A1 * | 7/2014 | Nguyen | A61C 17/0208 | 433/91 |
| 2014/0349249 A1 * | 11/2014 | Reyes | A61C 17/08 | 433/96 |
| 2015/0093716 A1 * | 4/2015 | Fulton, III | A61C 17/08 | 433/140 |
| 2015/0099993 A1 * | 4/2015 | Weaver | A61M 16/0463 | 600/531 |
| 2016/0015477 A1 * | 1/2016 | Ellis | A61C 1/0061 | 433/95 |
| 2017/0156832 A1 * | 6/2017 | Reyes | A61C 17/08 | |
| 2017/0245843 A1 * | 8/2017 | Reyes | A61C 17/08 | |
| 2019/0365517 A1 * | 12/2019 | DeGould | A61C 17/08 | |
| 2020/0155284 A1 * | 5/2020 | Baker | A61C 17/08 | |
| 2020/0352680 A1 * | 11/2020 | Nguyen | A61C 5/90 | |
| 2021/0045856 A1 * | 2/2021 | Thomas | A61C 17/125 | |
| 2021/0346125 A1 * | 11/2021 | Gordon | A61B 13/00 | |
| 2021/0346134 A1 * | 11/2021 | Reingold | A61C 17/08 | |
| 2021/0393382 A1 * | 12/2021 | Myers | A61C 17/22 | |
| 2021/0393383 A1 * | 12/2021 | Bullinger | A61C 17/12 | |
| 2022/0110732 A1 * | 4/2022 | Velky | A61C 17/08 | |
| 2023/0072783 A1 * | 3/2023 | Tassopoulos | A61M 1/86 | |

FOREIGN PATENT DOCUMENTS

| | | | | |
|---|---|---|---|---|
| DE | 202005016016 U1 * | 2/2006 | | A61C 17/043 |
| DE | 102005044841 A1 * | 3/2006 | | A61C 17/04 |
| DE | 202014005731 U1 * | 9/2014 | | A61C 17/043 |
| DE | 202019001370 U1 * | 8/2020 | | |
| EP | 0341721 A1 * | 11/1989 | | |
| FR | 3043906 A1 * | 5/2017 | | |
| GB | 2511815 A * | 9/2014 | | A46B 15/0081 |
| JP | 2004321710 A * | 11/2004 | | |
| JP | 2005013394 A * | 1/2005 | | |
| WO | WO-8706475 A1 * | 11/1987 | | |
| WO | WO-8606613 A1 * | 1/1988 | | |
| WO | WO-8800481 A * | 1/1988 | | A61M 1/008 |
| WO | WO-9407662 A1 * | 4/1994 | | B26D 1/28 |
| WO | WO-9604037 A1 * | 2/1996 | | A61M 3/0279 |
| WO | WO-03041777 A1 * | 5/2003 | | A61M 15/0028 |
| WO | WO 2008/113670 | 9/2008 | | |
| WO | WO-2018035219 A1 * | 2/2018 | | A61C 1/0061 |
| WO | WO-2018068901 A1 * | 4/2018 | | A61C 17/08 |
| WO | WO-2020081391 A1 * | 4/2020 | | A61F 13/00021 |
| WO | WO-2022026722 A1 * | 2/2022 | | |

OTHER PUBLICATIONS

Takai Noboru, "JP_2004321710_A_I_translated" (Year: 2004).*
Deyssig Roman, "DE 102005044841 A1_translated" (Year: 2006).*
Sato Fumiaki, "JP-2005013394-A-translated" (Year: 2005).*
Korff Florian, "DE 3939859 A1 translated version" (Year: 1991).*

* cited by examiner

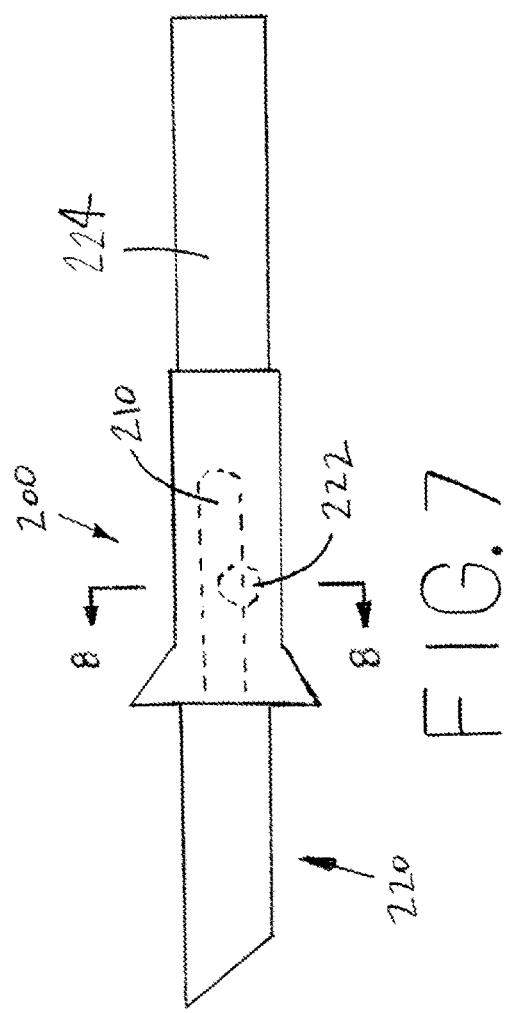
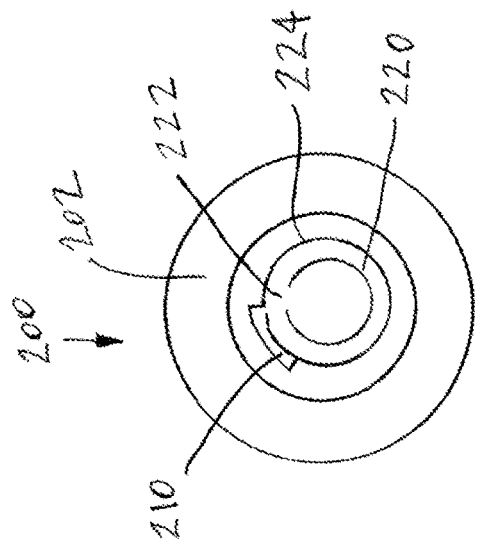
FIG. 7
FIG. 8

DISPOSABLE DENTAL AEROSOL DEVICE

RELATED APPLICATION

This application is a continuation-in-part of U.S. patent application Ser. No. 16/929,537, filed on Jul. 15, 2020, which was a continuation-in-part of U.S. patent application Ser. No. 16/888,770, filed on May 31, 2020, which was a continuation-in-part of U.S. patent application Ser. No. 16/865,843, filed on May 4, 2020, the disclosures of which are incorporated herein by reference.

BACKGROUND

This disclosure relates to a disposable dental aerosol device for use during a dental procedure and more particularly to a disposable dental aerosol suctioning device for capturing saliva, debris, and other fluids that aerosol or spray from a mouth of a patient during a dental procedure.

During a dental procedure it is important to be able to remove saliva, blood, water, tooth fragments, metals, and other debris or fluids from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector or a low volume ejector. A saliva ejector typically comprises a plastic flexible tube for placement in the mouth of a patient. The saliva ejector tube is connected to a valve which in turn is connected via suction tubing to a source of vacuum. In this manner, saliva is passed through the ejector tube, the valve, and the tubing to be disposed of in a sanitary manner. Once the procedure is completed, the ejector should be discarded and the valve should be sterilized by autoclave to be used again. Although it is suggested to autoclave the valve after each use, it is known that the autoclave procedure is hardly ever done. Another device that is capable of removing solid materials is a high volume evacuator system. A high volume evacuator system generally consists of a tube that may be inserted into a mouth of a patient with the tube connected to a valve which is connected via a tubing to a source of vacuum. Again, in this manner, debris may be removed from the mouth of the patient. After the dental procedure, the tube is disposed of and the valve should be sterilized for reuse. However, although it is suggested to sterilize the valve after use, it is known that this suggested procedure is hardly ever followed.

As can be appreciated, the saliva ejector and the high volume evacuator are used to remove liquids and debris from a mouth of a patient to prevent a patient from swallowing or aspirating liquids and debris produced during a dental procedure. However, during the dental procedure other matter, such as an aerosol cloud, is generated. The aerosol cloud may contain micro-droplets of matter such as small tissue, small bone fragments, bits of metals, and fluids such as saliva or blood, which become airborne and mist or splatter all over the room, equipment, patient, or medical personnel. Any production or distribution of the aerosol cloud should be avoided or prevented because it may contain contagious viruses or other organisms that could be transferred to a dentist or other dental personnel. The generation of the aerosol cloud is dangerous and undesirable and should be avoided.

Therefore, it would be desirable to have a disposable dental aerosol device that captures any aerosol produced during a dental procedure for preventing aerosol from contacting or contaminating a patient, a dentist, a dental room, or dental equipment. It would also be desirable to have a disposable dental aerosol device that is easy to install on or remove from a dental valve attached to suction tubing connected to a source of vacuum. Further, it would be advantageous to have a disposable dental aerosol device that is adjustable in order to control suctioning strength when required during a dental procedure.

BRIEF SUMMARY

In one form of the present disclosure, a disposable dental aerosol device comprises a body having an exterior surface, a front end having an angled opening having a retraction lip portion, a rear end having an opening, and a lumen formed between the front end and the rear end, and a pressure relief opening formed in the exterior surface of the body.

In another form of the present disclosure, a disposable dental aerosol device comprises a body having an exterior surface, a front end having an angled opening having a retraction lip portion, a rear end having an opening with the rear end for receiving a dental valve, and a lumen formed between the front end and the rear end, and a pressure relief opening formed in the exterior surface of the body.

In yet another form of the present disclosure, a disposable dental aerosol device comprises a body having an exterior surface, a front end having an angled opening having a retraction lip portion, a rear end having an opening, and a lumen formed between the front end and the rear end, a pressure relief opening formed in the exterior surface of the body, a first pressure relief opening formed in the exterior surface of the body, a second pressure relief opening formed in the exterior surface of the body, and a reinforcing rib positioned on the exterior surface of the body between the first pressure relief opening and the second pressure relief opening.

The present disclosure provides a disposable dental aerosol device for use with a dental instrument that is suitable for one time use and may be discarded after a single use.

The present disclosure provides a disposable dental aerosol device that is easy to install on a dental valve connected to suction tubing which is in turn connected to a source of vacuum and have a tip installed on another end of the disposable dental aerosol device.

The present disclosure provides a disposable dental aerosol device that is small, lightweight, easy to handle, easy to install, and easy to operate.

The present disclosure also provides a disposable dental aerosol device which is of simple construction and design and which can be easily employed with reliable results.

The present disclosure is related to a disposable dental aerosol device that does not require sterilization and captures aerosol to prevent contamination.

The present disclosure provides a disposable dental aerosol device that may have an antimicrobial agent or chemical incorporated into the device to prevent any bacterial growth on the device. The antimicrobial agent or chemical may also be a coating applied to the disposable dental aerosol device.

The present disclosure is related to a disposable dental aerosol that may be constructed of plastic that is recyclable or biodegradable to reduce the cost of the device and to allow the device to be disposable and discarded after a single use.

The present disclosure provides a disposable dental aerosol device that is used to capture any aerosol produced during a dental procedure for preventing aerosol from contacting or contaminating an individual, a dental room, or dental equipment.

The present disclosure is related to a disposable dental aerosol device that automatically suctions or captures any saliva, liquid, or other material produced during a dental procedure.

The present disclosure is also directed to a disposable dental aerosol device that is adjustable in order to control suctioning strength when required during a dental procedure.

The present disclosure provides a disposable dental aerosol device that may be used with high volume evacuator valves and saliva ejector valves and does not require that the valves be retrofitted, modified, or changed.

The present disclosure is directed to a disposable dental aerosol device that may be easily inserted into a tip receiving end of a high volume evacuator valve or a saliva ejector valve.

The present disclosure is also directed to a disposable dental aerosol device that may be inserted into a tip receiving end of a high volume evacuator valve or a saliva ejector valve and does not interfere with a tip or straw used with the valves.

The present disclosure further provides a disposable dental aerosol device for use with a dental instrument that is adjustable and is suitable for one time use and may be discarded after a single use.

The present disclosure provides a disposable dental aerosol device that is easy to install on a dental valve connected to suction tubing which is in turn connected to a source of vacuum and has a tip installed on another end of the disposable dental aerosol device and the disposable dental aerosol device is adjustable to adjust vacuum.

The present disclosure provides a disposable dental aerosol device that is adjustable and may have an antimicrobial agent or chemical incorporated into the device to prevent any bacterial growth on the device. The antimicrobial agent or chemical may also be a coating applied to the disposable dental aerosol device.

The present disclosure provides a disposable dental aerosol device that is adjustable and is used to capture any aerosol produced during a dental procedure for preventing aerosol from contacting or contaminating an individual, a dental room, or dental equipment.

These and other advantages of the present disclosure will become apparent after considering the following detailed specification in conjunction with the accompanying drawings, wherein:

BRIEF DESCRIPTION OF THE DRAWINGS

FIG. 7 is a side view of the disposable dental aerosol device shown in FIG. 6 with the disposable dental aerosol device being installed on a tip and parts of the disposable dental aerosol device and the tip being shown in phantom;

FIG. 8 is a cross-sectional view of the disposable dental valve device shown in FIG. 7 taken along the plane of line 8-8;

DETAILED DESCRIPTION OF A PREFERRED EMBODIMENT

Figure 1:
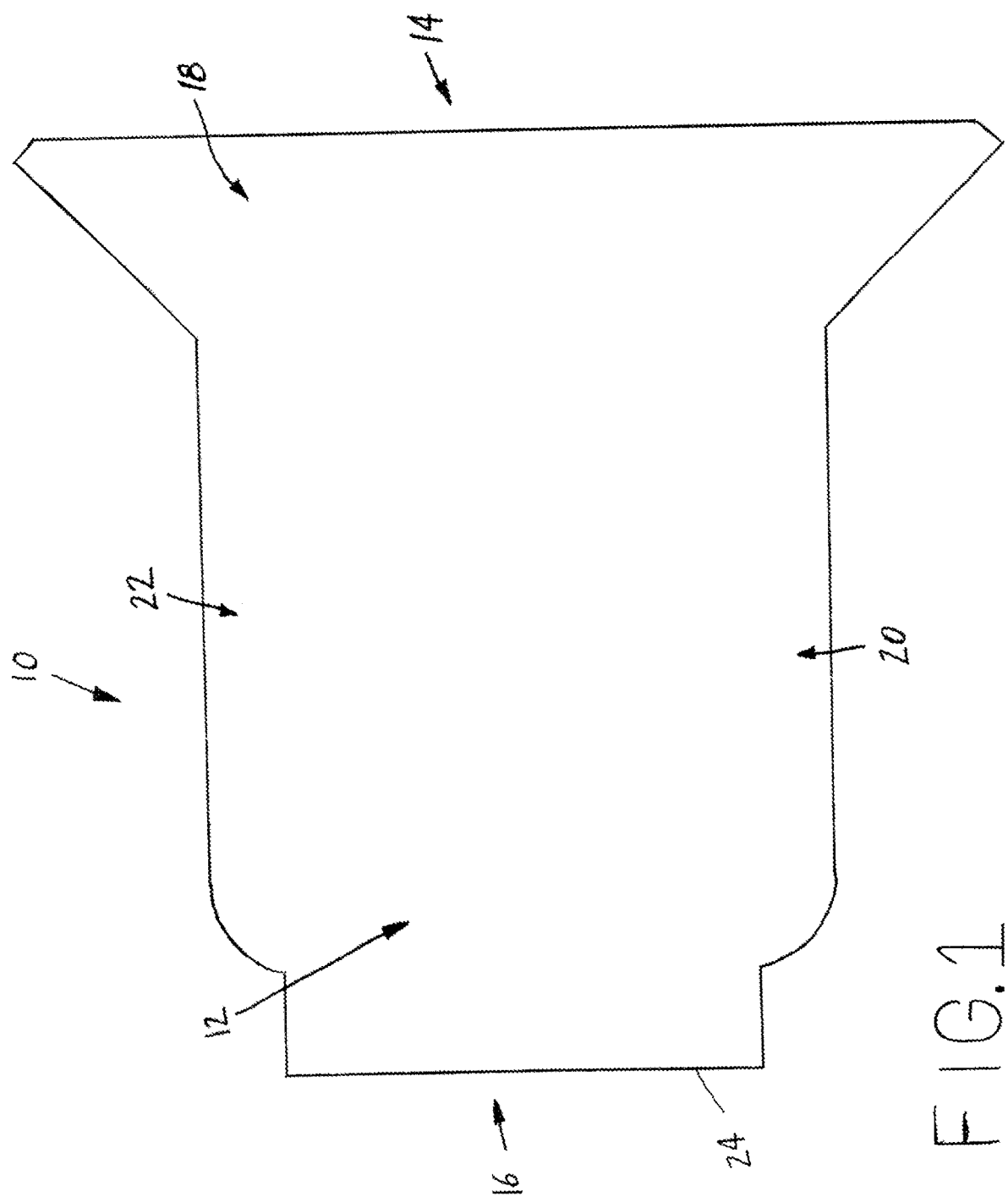
FIG. 1 is a side perspective view of a disposable dental aerosol device constructed according to the present disclosure.

Referring now to the drawings, wherein like numbers refer to like items, number 10 identifies a disposable dental aerosol device for use with a dental system (not shown) constructed according to the present disclosure. With reference now to FIG. 1, the device 10 comprises a body 12 having a tip receiving end 14, a valve receiving end 16, a funnel 18, a first aerosol capturing port 20, and a second aerosol capturing port 22. Although the pair of ports 20 and 22 are shown, it is also possible and contemplated to have one port or more than a pair of ports. The tip receiving end 14 is adapted to receive an evacuator tip device or straw (not shown) such as a high volume evacuator or a low volume evacuator (saliva ejector). The funnel 18 flares outwardly from the body 12 and is wider than the body 12 to capture aerosol. The valve receiving end 16 is adapted to receive a dental valve (not shown) which is connected to a suction system (also not shown) which is used to dispose of any aerosol, saliva, liquid, or debris removed from a mouth of a patient during a dental procedure. The device 10 is constructed of material that allows the device 10 to be disposable and suitable for one time use. The valve receiving end 16 also has a circular stop 24 which may be used to position the device 10 within a dental valve. Although the funnel 18 is shown being circular at the tip receiving end 14, it is to be understood that the funnel 18 may be various other shapes such as rectangular, oval, triangular, or segmented. In any configuration the funnel 18 is flared outwardly and is wider than the body 12 to be able to capture aerosol. As should be appreciated, the device 10 is used with a suction system (not shown) which provides suction through an evacuator tip device, the device 10, and a hose so that any aerosol, debris, liquid, or saliva that is introduced into the device 10 and an evacuator tip device is removed through the device 10 and an evacuator tip device, a dental valve, and a hose when a movable valve sealing body associated with a dental valve is in an open state or a partially open state.

Figure 2:
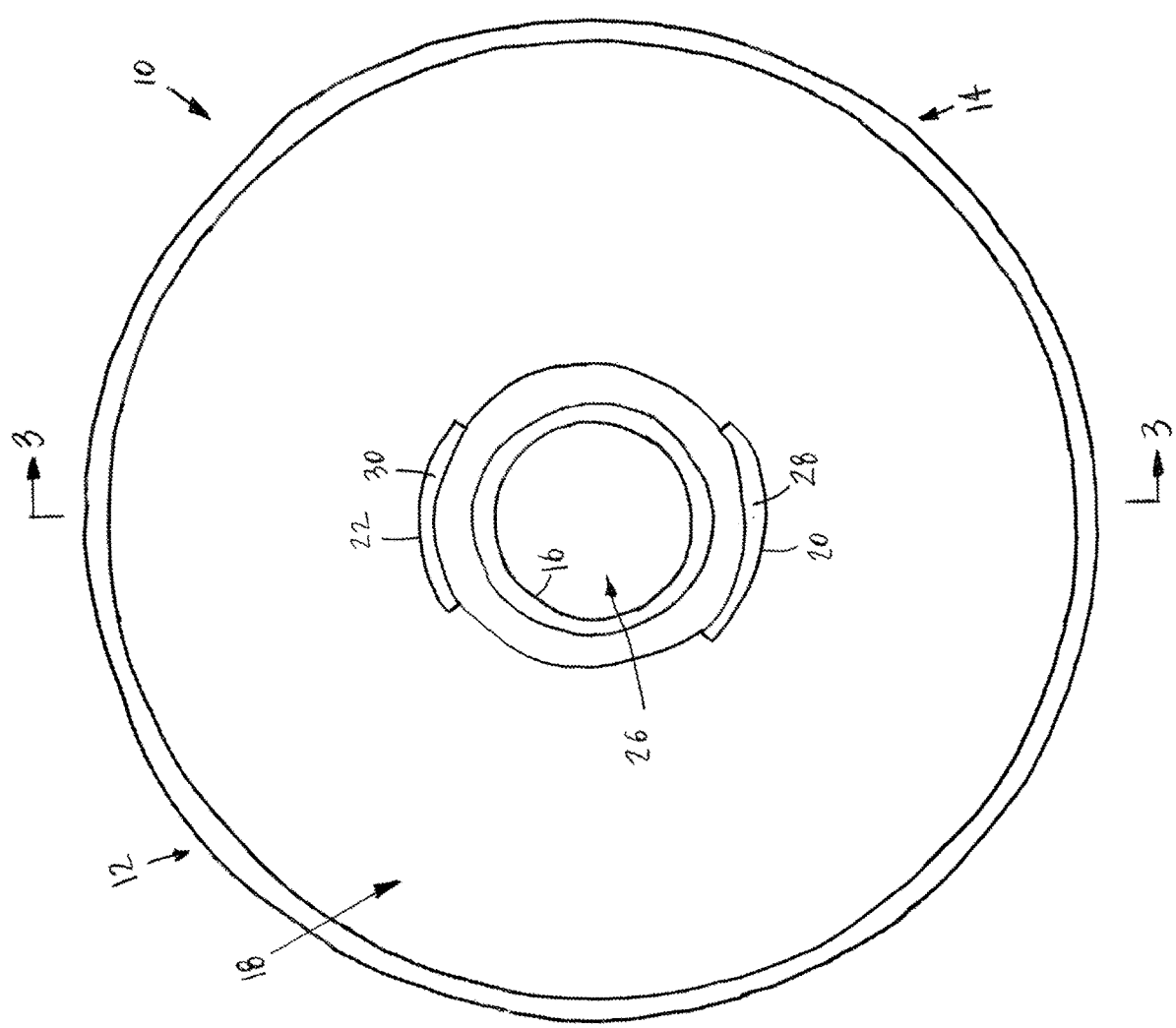
FIG. 2 is a front view of the disposable dental aerosol device constructed according to the present disclosure.

With reference now to FIG. 2, a front view of the disposable dental aerosol device 10 is illustrated. The device 10 comprises the body 12 having the tip receiving end 14, the valve receiving end 16, the funnel 18, the first aerosol capturing port 20, and the second aerosol capturing portion 22. The body 12 also has a central lumen 26 formed between the tip receiving end 14 and the valve receiving end 16. The first aerosol capturing port 20 has a first aerosol capturing port lumen 28. The second aerosol capturing port 22 has a second aerosol capturing port lumen 30.

Figure 3:
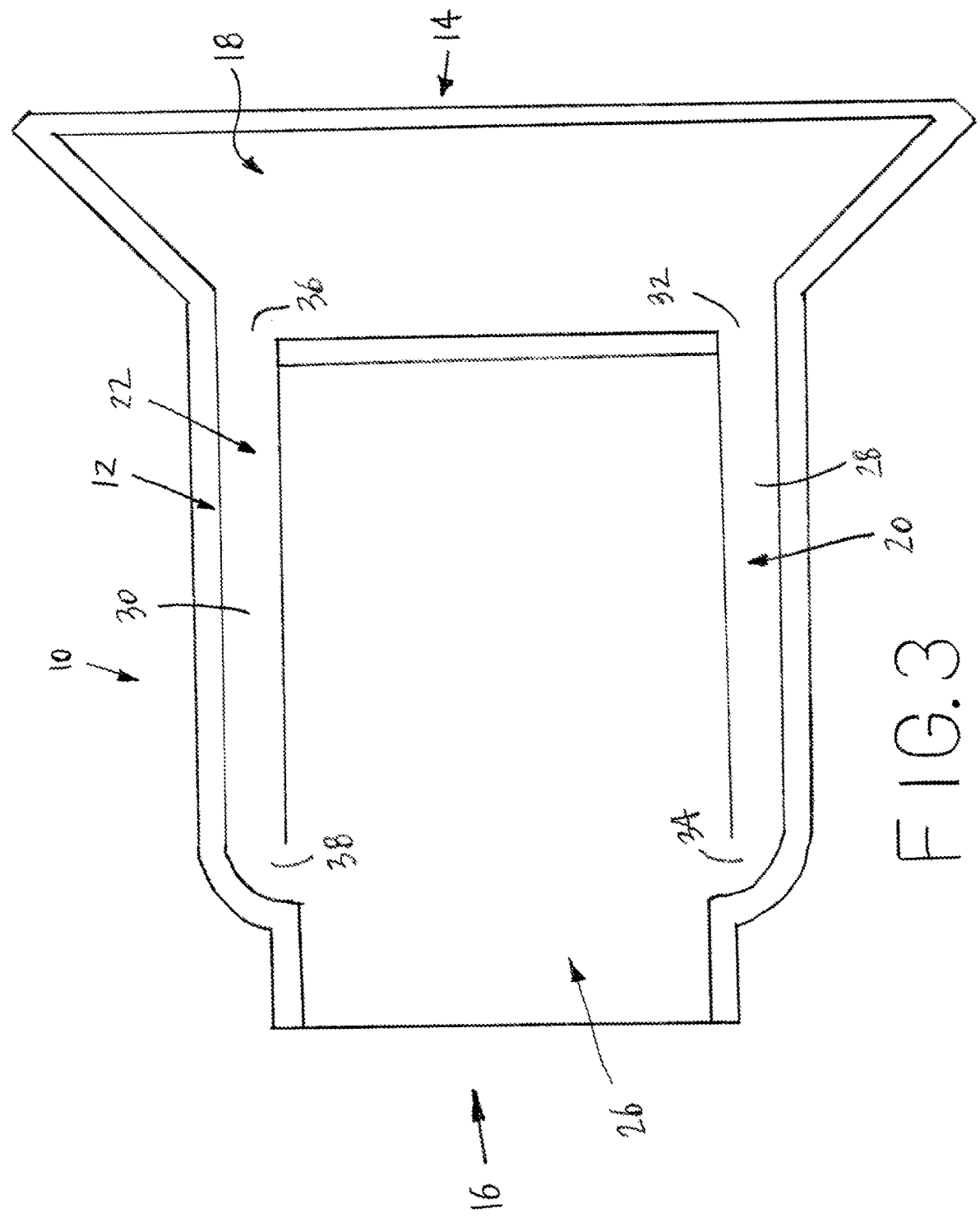
FIG. 3 is a cross-sectional view of the disposable dental aerosol device shown in FIG. 2 taken along the plane of line 3-3.

FIG. 3 depicts a cross-sectional view of the disposable dental aerosol device 10. The device 10 comprises the body 12 having the tip receiving end 14, the valve receiving end 16, the funnel 18, the first aerosol capturing port 20, and the second aerosol capturing portion 22. The body 12 also has a central lumen 26 formed between the tip receiving end 14 and the valve receiving end 16. The first aerosol capturing port 20 has the first aerosol capturing port lumen 28 that extends from a first port entrance opening 32 formed in the funnel 18 to a first port exit opening 34 formed in the central lumen 26. The second aerosol capturing port 22 has the second aerosol capturing port lumen 30 that extends from a second port entrance opening 36 formed in the funnel 18 to a second port exit opening 38 formed in the central lumen 26. As can be appreciated, aerosol is suctioned through the funnel 18 through either the port entrance openings 32 or 36 through either the lumen 28 or 30 out either the port exit openings 34 or 38 into the central lumen 26. As will be discussed in further detail herein, a tip may be inserted into the central lumen 26. However, the tip is not long enough to interfere or block the exit openings 34 or 38 so that aerosol may flow into the central lumen 26 and out the valve receiving end 16.

Figure 4:
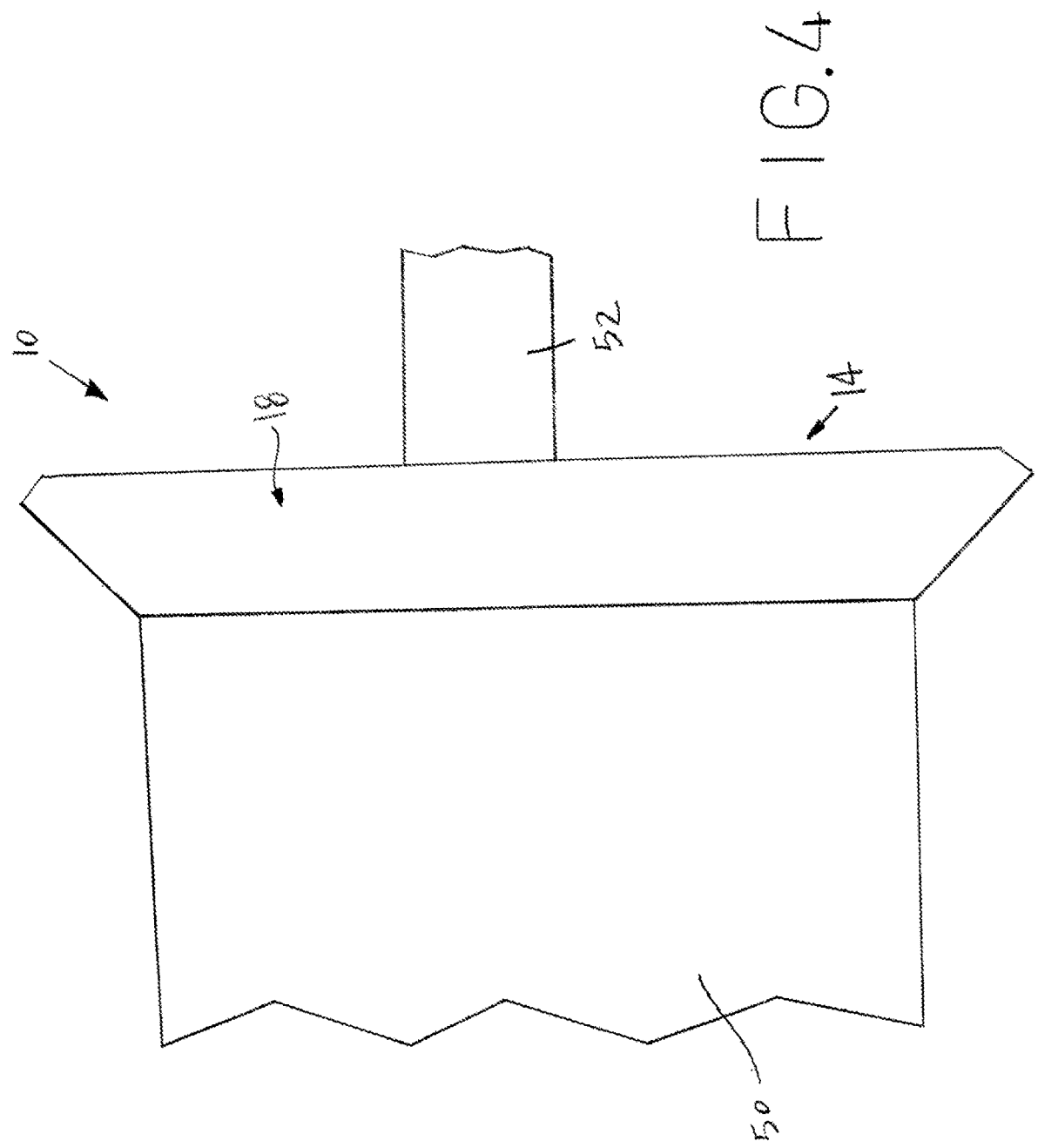
FIG. 4 is a side view of the disposable dental aerosol device constructed according to the present disclosure being inserted into a dental valve, shown in partial view, and having a tip inserted into the disposable dental aerosol device with a partial side view of the tip being shown.

With reference now to FIG. 4, the disposable dental aerosol device 10 is shown being inserted into a dental valve device 50. Although not shown, as is known, the dental valve device 50 may be connected to a tailpiece which is connected to a tubing or hose which is connected to a suction system within a dental facility. The suction system is used to provide suction to the dental valve 50 and to dispose of any material, such as fluids and solids, that are suctioned into the dental valve 50, the tailpiece, and the tubing. A tip 52, such as an evacuator tip device or straw such as a high volume evacuator or a low volume evacuator (saliva ejector), is inserted into the tip receiving end 14 of the device 10. In this manner, aerosol (not shown) may be captured by the funnel 18 to be suctioned through the device 10 and the dental valve 50 into the suction system for disposal. Also, the funnel 18 is shown to be flared outwardly from the dental valve 50 and the funnel 18 is wider than the dental valve 50 to be able to capture aerosol that is suctioned into the device 10. Once a dental procedure is completed, the disposable dental aerosol device 10, the dental valve 50, and the tip 52 may be discarded.

Figure 5:
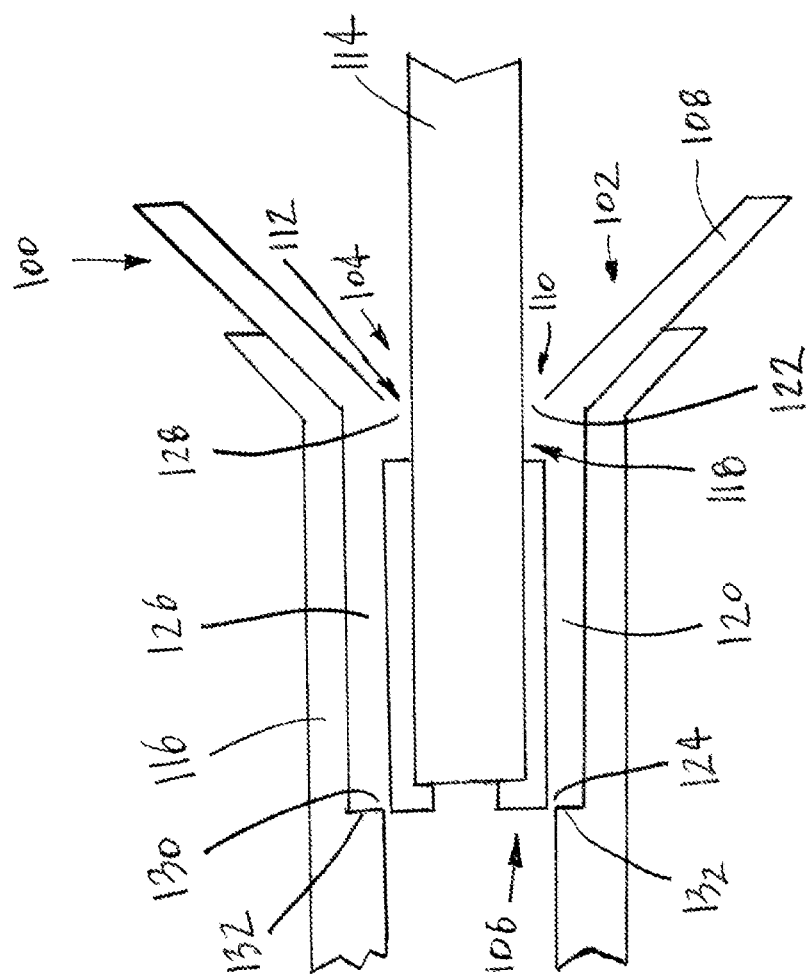
FIG. 5 is a cross-sectional view of another embodiment of a disposable dental aerosol device constructed according to the present disclosure being inserted into a dental valve, shown in partial view, and having a tip inserted into the disposable dental aerosol device with a partial side view of the tip being shown.

FIG. 5 shows another embodiment of a disposable dental aerosol device 100 constructed according to the present disclosure which provides for being able to adjust suction or vacuum during use. The device 100 comprises a body 102 having a tip receiving end 104, a valve receiving end 106, a funnel 108, a first aerosol capturing port 110, and a second aerosol capturing portion 112. Although the pair of ports 110 and 112 are shown, it is also possible and contemplated to have one port or more than a pair of ports. The tip receiving end 104 is adapted to receive a tip 114 such as an evacuator tip device or straw such as a high volume evacuator or a low volume evacuator (saliva ejector). The funnel 108 flares outwardly from the body 102 and is wider than the body 102 to capture aerosol. The valve receiving end 106 is adapted to receive a dental valve 116 which is connected to a suction system (not shown) which is used to dispose of any aerosol, saliva, liquid, or debris removed from a mouth of a patient during a dental procedure. The device 100 is constructed of material that allows the device 100 to be disposable and suitable for one time use. The valve receiving end 106 also has a circular stop 118 which may be used to position the device 10 within a dental valve. Although the funnel 108 is shown being circular at the tip receiving end 104, it is to be understood that the funnel 108 may be various other shapes such as rectangular, oval, triangular, or segmented. In any configuration the funnel 108 is flared outwardly and is wider than the body 102 and the dental valve 116 to be able to capture aerosol. As should be appreciated, the device 100 is used with a suction system (not shown) which provides suction through the tip 114, the device 100, and the dental valve 116 so that any aerosol, debris, liquid, or saliva that is introduced into the device 100 is removed through the device 100 when a movable valve sealing body associated with the dental valve 116 is in an open state or a partially open state.

The body 102 has a central lumen 118 formed between the tip receiving end 104 and the valve receiving end 106. The central lumen 118 is used to receive the tip 114. The first aerosol capturing port 110 has a first aerosol capturing port lumen 120 that extends from a first port entrance opening 122 formed in the funnel 108 to a first port exit opening 124 formed in the valve receiving end 106. The second aerosol capturing port 112 has a second aerosol capturing port lumen 126 that extends from a second port entrance opening 128 formed in the funnel 108 to a second port exit opening 130 formed in the valve receiving end 106. As can be appreciated, aerosol is suctioned through the funnel 108 through either the port entrance openings 122 or 128 through either the lumen 120 or 126 out either the port exit openings 124 or 130 into the dental valve 116. The device 100 is adjustable within the dental valve 116. In particular, the dental valve 116 has a circular ledge 132 which the valve receiving end 106 may abut. When the valve receiving end 106 is adjacent to the ledge 132, any suction being generated by the suction system is restricted or reduced. The device 100 may be moved within the dental valve device 116 to move the valve receiving end 106 away from the ledge 132 to increase suction. In this manner, the device 100 is adjustable and capable of increasing or decreasing suction. Once a dental procedure is completed, the disposable dental aerosol device 100, the tip 114, and the dental valve 116 may be discarded.

Figure 6:
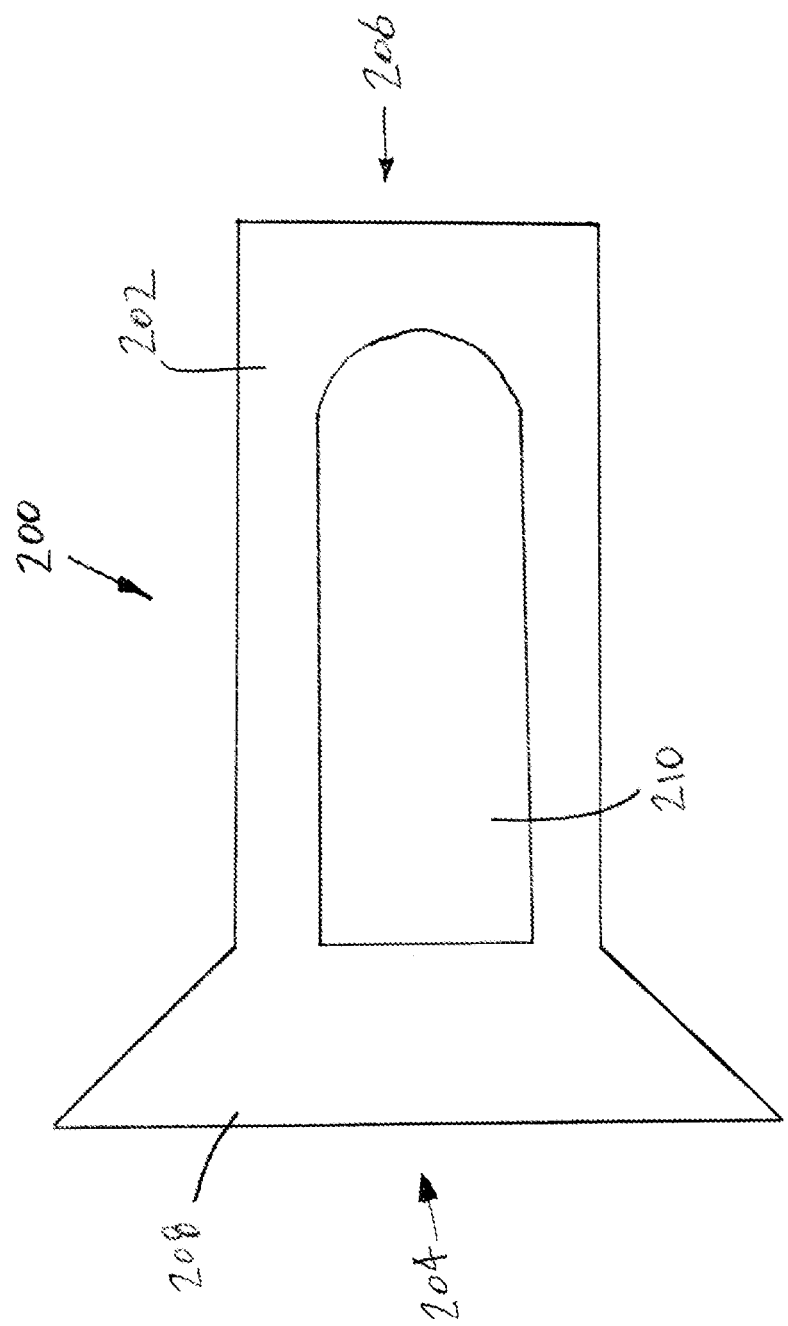
FIG. 6 is a side view of another embodiment of a disposable dental aerosol device constructed according to the present disclosure.

With particular reference now to FIG. 6, another embodiment of a disposable dental aerosol device 200 is illustrated. The disposable dental aerosol device 200 comprises a body 202 having a front end 204, a rear end 206, a funnel 208, and an aerosol capturing port 210. Although one port 210 is shown, it is also possible to have more than the one port 210. The body 202 is adapted to receive an evacuator tip device or straw (not shown) such as a high volume evacuator or a low volume evacuator (saliva ejector) through the body 202. The tip device is similar to currently available tip devices with the exception of having a hole or an aperture formed in a side of the tip device, as will be explained further herein. The funnel 208 flares outwardly from the body 202 and is wider than the body 202 to capture aerosol. The device 200 is constructed of material that allows the device 200 to be disposable and suitable for one time use. Although the funnel 208 is shown being circular at the front end 204, it is to be understood that the funnel 208 may be various other shapes such as rectangular, oval, triangular, or segmented. In any configuration the funnel 208 is flared outwardly and is wider than the body 202 to be able to capture aerosol. As should be appreciated, the device 200 is used with a suction system (not shown) which provides suction so that any aerosol, debris, liquid, or saliva that is introduced into the device 200 is removed through the device 200.

FIG. 7 shows a side view of the disposable dental aerosol device 200 being inserted on a tip 220. The tip 220 has an aperture 222 formed in a side 224 of the tip 220. The aperture 222 is shown in phantom since the body 202 is covering the tip 220. Although the aperture 222 is shown, it is also possible that the aperture 222 may take on various other configurations such as a slot, a rectangle, an oval, or any other sized and shaped opening that can be selectively covered and uncovered. The aerosol capturing port 210 is also shown in phantom. The aerosol capturing port 210 is used to selectively cover and uncover the aperture 222 to be able to adjust suction. For example, when aerosol is not present, the device 200 may be adjusted or twisted so that the aerosol capturing port 210 is not inline with the aperture 222. In this event, the aperture 222 is covered by the body 202. However, when suction is needed because aerosol is present or being generated, the aerosol capturing port 210 may be moved to be in alignment with the aperture 222 so that aerosol may flow through the aerosol capturing port 210 and the aperture 222.

Referring to FIG. 8, a cross-sectional view of the disposable dental aerosol device 200 and the tip 220 are illustrated. The tip 220 has the aperture 222 formed in the side 224 of the tip 220. The aperture 222 is shown being partially covered by the body 202 of the device 200. The aerosol capturing port 210 is partially over the aperture 222. The aerosol capturing port 210 is used to selectively cover and uncover the aperture 222 to be able to adjust suction.

Figure 9:
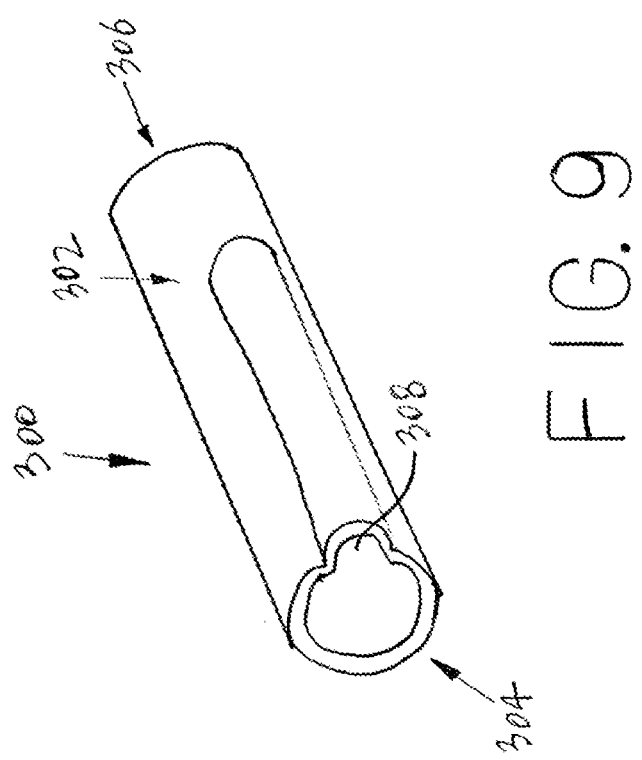
FIG. 9 is a side perspective view of another embodiment of a disposable dental aerosol device constructed according to the present disclosure.

FIG. 9 depicts another embodiment of a disposable dental aerosol device 300 constructed according to the present disclosure. The disposable aerosol device 300 comprises a body 302 having a front end 304, a rear end 306, and an aerosol capturing port 308. Although one port 308 is shown, it is also possible to have more than the one port 308. The body 302 is adapted to receive an evacuator tip device or straw (not shown), such as the tip 220 (FIG. 7), such as a high volume evacuator or a low volume evacuator (saliva ejector) through the body 302. One difference between the device 200 and the device 300 is that there is no funnel at the front end 304 of the device 300. The port 308 is used to capture aerosol. The device 300 is constructed of material that allows the device 300 to be disposable and suitable for one time use. As should be appreciated, the device 300 is used with a suction system (not shown) which provides suction so that any aerosol, debris, liquid, or saliva that is introduced into the device 300 is removed through the tip 220 (FIG. 7) when the device 300 is installed over the tip 220. Further, suction may be adjusted by turning or twisting the port 308 relative to the aperture 222 (FIG. 7).

Figure 10:
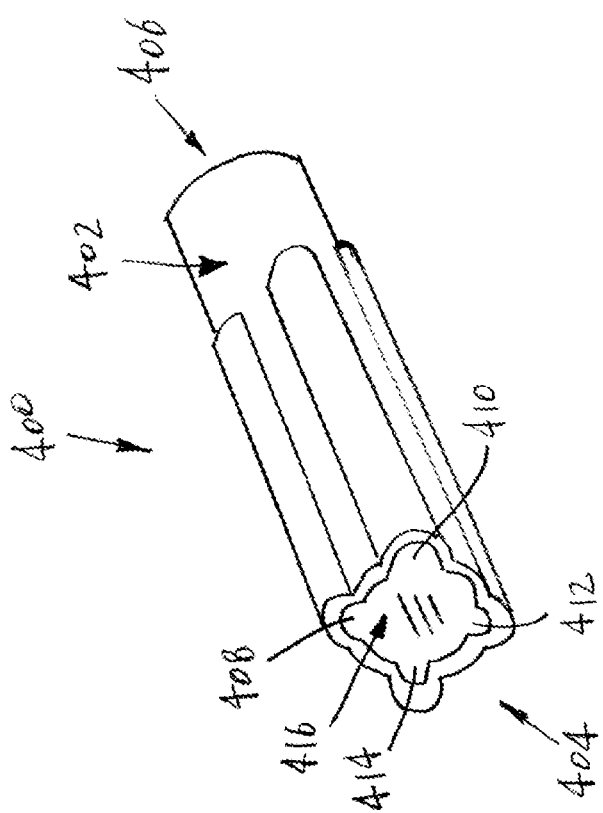
FIG. 10 is a side perspective view of another embodiment of a disposable dental aerosol device constructed according to the present disclosure.

With particular reference now to FIG. 10, another embodiment of a disposable dental aerosol device 400 constructed according to the present disclosure. The disposable aerosol device 400 comprises a body 402 having a front end 404, a rear end 406, and a first aerosol capturing port 408, a second aerosol capturing port 410, a third aerosol capturing port 412, and a fourth aerosol capturing port 414. The body 402 is adapted to receive an evacuator tip device or straw (not shown), such as the tip 220 (FIG. 7), such as a high volume evacuator or a low volume evacuator (saliva ejector) through a lumen 416 formed in the body 402. One difference between the device 200 and the device 400 is that there is no funnel at the front end 404 of the device 400. The ports 408, 410, 412, and 414 are used to capture aerosol. The device 400 is constructed of material that allows the device 400 to be disposable and suitable for one time use. As should be appreciated, the device 400 is used with a suction system (not shown) which provides suction so that any aerosol, debris, liquid, or saliva that is introduced into the device 400 is removed through the tip 220 (FIG. 7) when the device 400 is installed over the tip 220. Further, suction may be adjusted by turning or twisting the ports 408, 410, 412, and 414 relative to the aperture 222 (FIG. 7). As can be appreciated, the tip 220 may be constructed having four apertures and the ports 408, 410, 412, and 414, may be used to cover or uncover the apertures to adjust suction and aerosol captured by the device 400.

Figure 11:
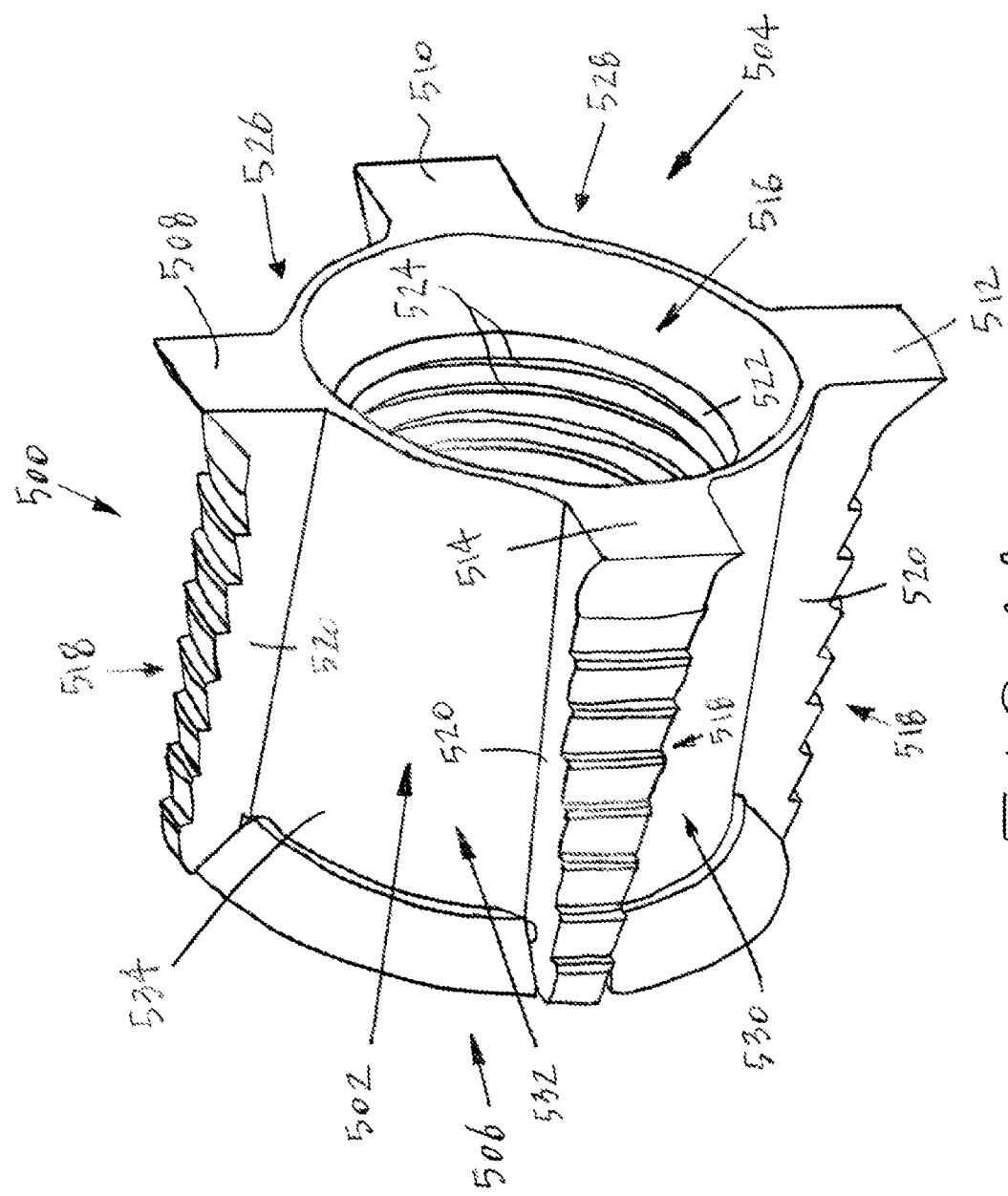
FIG. 11 is a side perspective view of another embodiment of a disposable dental aerosol device constructed according to the present disclosure.

FIG. 11 illustrates another embodiment of a disposable dental aerosol device 500 constructed according to the present disclosure. The disposable aerosol device 500 comprises a body 502 having a front end or tip receiving end 504, a rear end or valve receiving end 506, a first vane or fin 508, a second vane or fin 510, a third vane or fin 512, and a fourth vane or fin 514. The vanes 508, 510, 512, and 514 extend from the front end 504 to the rear end 506. Although the four vanes 508, 510, 512, and 514 are shown and described, it is to be understood that less or more vanes may be employed. The body 502 has a lumen 516 formed therein with the lumen 516 adapted to receive an evacuator tip device or straw (not shown), such as the tip 220 (FIG. 7), such as a high volume evacuator tip or a low volume evacuator (saliva ejector) tip. Each of the vanes 508, 510, 512, and 514 may have a series of saw toothed ridges 518 along a length 520 of each of the vanes 508, 510, 512, and 514. The ridges 518 are used to secure the device 500 within a valve (not shown), as will be discussed in detail further herein. The lumen 516 has an interior surface 522 having a number of ridges 524. The ridges 524 are used to secure a tip device or straw therein. A first aerosol capturing port 526 is formed between the first vane 508 and the second vane 510. A second aerosol capturing channel 528 is formed between the second vane 510 and the third vane 512. A third aerosol capturing channel 530 is formed between the third vane 512 and the fourth vane 514. A fourth aerosol capturing channel 532 is formed between the fourth vane 514 and the first vane 508. The aerosol capturing channels 526, 538, 530, and 532 are formed along an exterior surface 534 of the body 502 of the device 500. Aerosol (not shown) may flow through the aerosol capturing channels 526, 528, 530, and 532. The device 500 is constructed of material that allows the device 500 to be disposable and suitable for one time use. As should be now recognized, the device 500 is used with a suction or vacuum system (not shown) which provides suction so that any aerosol, debris, liquid, or saliva that is introduced into the device 500 is removed through the aerosol capturing channels 526, 528, 530, and 532.

Figure 12:
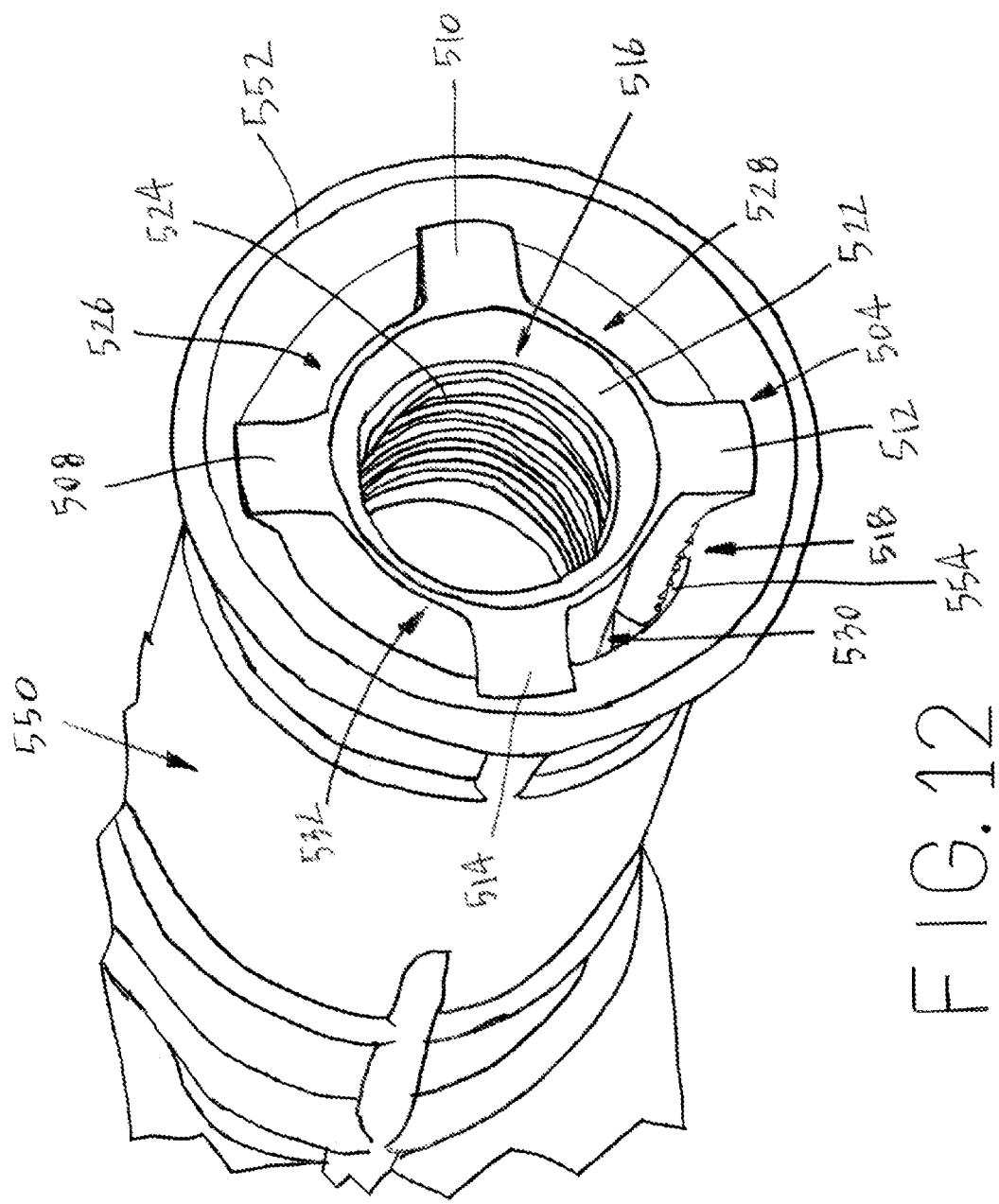
FIG. 12 is front perspective view of the disposable dental aerosol device shown in FIG. 11 being inserted into a dental valve with the dental valve being partially shown.

With reference now to FIG. 12, the aerosol capturing device 500 is shown being installed in a dental valve 550. The dental valve 550 has a tip receiving end 552 in which the device 500 is inserted. The vanes 508, 510, 512, and 514 are shown at the front end 504 of the device 500. The first aerosol capturing channel 526 is formed between the first vane 508 and the second vane 510. The second aerosol capturing channel 528 is formed between the second vane 510 and the third vane 512. The third aerosol capturing channel 530 is formed between the third vane 512 and the fourth vane 514. The fourth aerosol capturing channel 532 is formed between the fourth vane 514 and the first vane 508. The aerosol capturing channels 526, 528, 530, and 532 form channels or passages through which aerosol may pass from the tip receiving end 552 into the dental valve 550 to be disposed of through a vacuum system (not shown). The series of saw toothed ridges 518 along the third vane 512 is shown gripping an interior surface 554 of the dental valve 550. The ridges 518 are used to secure the device 500 within the valve 550. The lumen 516 has the interior surface 522 having the number of ridges 524 that are used to secure a tip or straw. With a tip or straw inserted into the lumen 516 through the front end 504, the device 500 is capable of capturing aerosol during a dental procedure at the same time the tip or straw is functioning to remove saliva or other matter. In essence, the device 500 acts as an insert that allows aerosol to be captured without inhibiting the functioning of a tip or straw inserted into the device 500. Also, it is possible and contemplated that the device 500 may be incorporated into the dental valve 550 and provided as a unitary construction.

Figure 13:
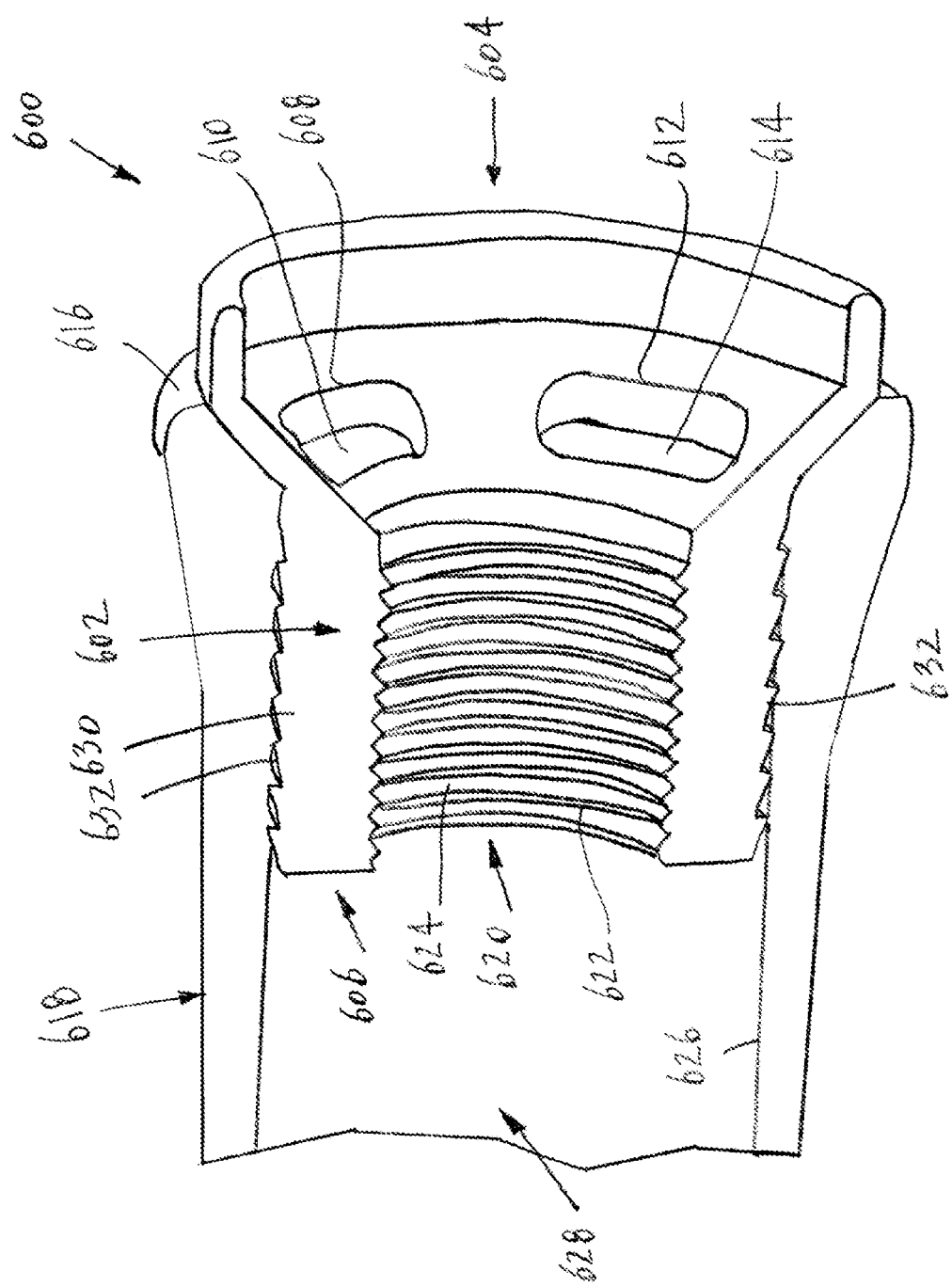
FIG. 13 is a partial cross-sectional view of another embodiment of a disposable dental aerosol device constructed according to the present disclosure.

FIG. 13 depicts another embodiment of a disposable dental aerosol device 600 constructed according to the present disclosure. The disposable aerosol device 600 comprises a body 602 having a front end or tip receiving end 604, a rear end or valve receiving end 606, a first aerosol capturing opening 608, a first aerosol lumen or channel 610, a second aerosol capturing opening 612, and a second aerosol lumen or channel 614. Although the pair of openings 608 and 612 and lumens 610 and 614 are shown, it is also possible and contemplated to have more or less openings and lumens. In particular, in the cross-sectional view of FIG. 13, there are four openings and lumens. The front end or tip receiving end 604 is adapted to receive an evacuator tip device or straw (not shown) such as a high volume evacuator or a low volume evacuator (saliva ejector). The device 600 is shown being inserted into a tip receiving end 616 of a dental valve 618. The device 600 has a lumen 620 formed between the front end 604 and the rear end 606. The lumen 620 allows a tip device or straw to be inserted therein. The lumen 620 may have a number of ridges 622 along an interior surface 624 of the device 600. The ridges 622 are used to secure a tip device or straw therein. The dental valve 618 has an interior surface 626 and a lumen 628. The device 600 also has an exterior surface 630 having a series of saw toothed ridges 632 along the exterior surface 630. The ridges 632 are used to secure the device 600 within the interior surface 626 of the dental valve 618. Although not shown, each lumen 610 and 614 has an exit opening at the rear end 606 of the device 600. Also, the device 600 may have a circular opening 634 to capture and direct aerosol toward the openings 608 and 612. Aerosol (not shown) may flow through the aerosol capturing openings 608 and 612 through the lumens 610 and 614, respectively, and out the exit openings into the lumen 628 of the dental valve 618. The device 600 is constructed of material that allows the device 600 to be disposable and suitable for one time use. The device 600 is used with a suction or vacuum system (not shown) which provides suction so that any aerosol, debris, liquid, or saliva that is introduced into the device 600 is captured by the aerosol capturing openings 608 and 612 to be directed to the lumen 628 of the dental valve 618 to be disposed of by the suction system.

Figure 14:
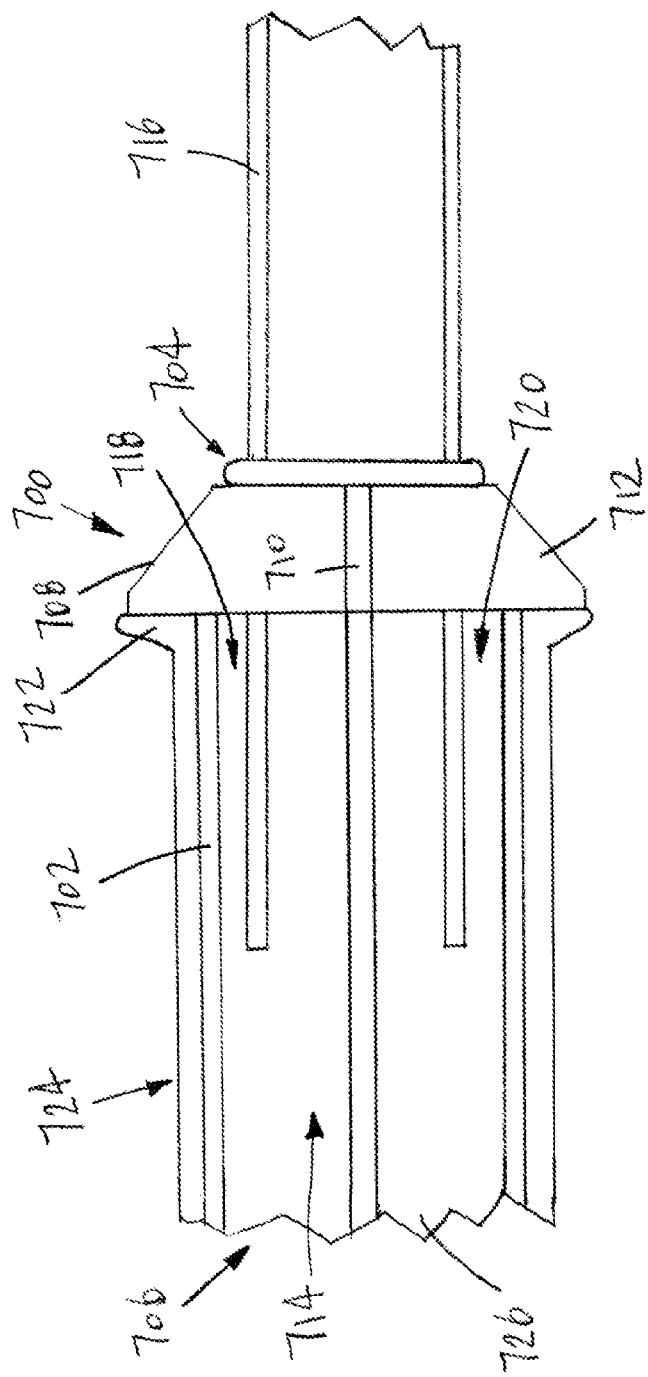
FIG. 14 is a partial cross-sectional view of another embodiment of a disposable dental aerosol device constructed according to the present disclosure being inserted into a dental valve with the dental valve being partially shown and in cross-section and the disposable dental aerosol device having a tip device inserted therein with the tip device being shown in cross-section.

Referring now to FIG. 14, another embodiment of a disposable aerosol capturing device 700 is illustrated. The device 700 comprises a body 702 having a front end or tip receiving end 704, a rear end or valve receiving end 706, a first vane or fin 708, a second vane or fin 710, and a third vane or fin 712. The vanes 708, 710, and 712 extend from the front end 704 to the rear end 706. Although three vanes 708, 710, and 712 are shown and described, it is to be understood that less or more vanes may be employed. The body 702 has a lumen 714 formed therein with the lumen 714 adapted to receive an evacuator tip device or straw 716. The device 716 may be a high volume evacuator tip or a low volume evacuator (saliva ejector) tip. A first aerosol capturing channel 718 is formed between the first vane 708 and the second vane 710. A second aerosol capturing channel 720 is formed between the second vane 710 and the third vane 712. The device 700 is inserted into a tip receiving end 722 of a dental valve 724. The dental valve 724 has a lumen 726 through which aerosol (not shown) may be captured, directed, and flow. Aerosol (not shown) may flow through the aerosol capturing channels 718 and 720. The device 700 is constructed of material that allows the device 700 to be disposable and suitable for one time use. As should be now recognized, the device 700 is used with a suction or vacuum system (not shown) which provides suction so that any aerosol, debris, liquid, or saliva that is introduced into the device 700 is removed through the aerosol capturing channels 718 and 720. Again, although two aerosol capturing channels are depicted, one or less channels may be formed in the device 700.

Figure 15:
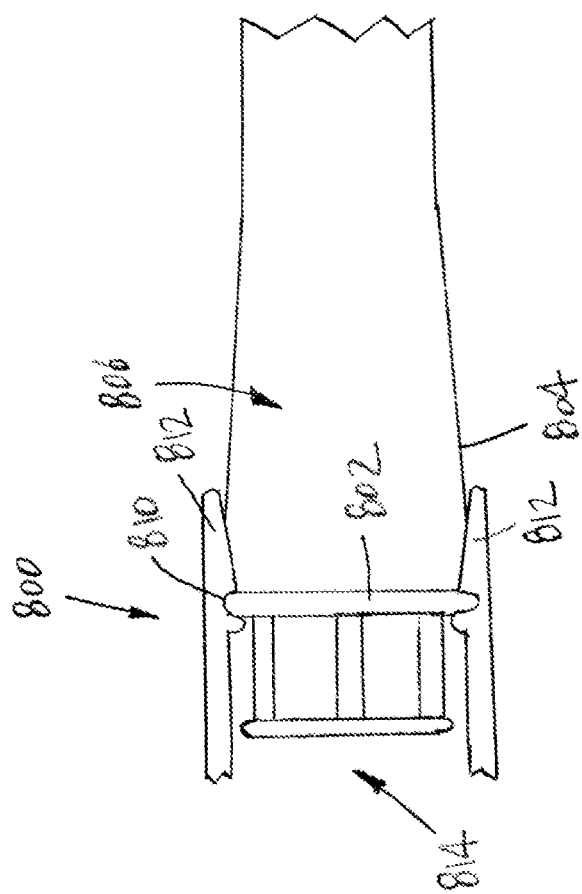
FIG. 15 is a partial cross-sectional view of another embodiment of a disposable dental aerosol device constructed according to the present disclosure being inserted onto a dental valve with the dental valve being partially shown and in cross-section.

With particular reference now to FIG. 15, another embodiment of a disposable aerosol capturing device 800 is shown. The disposable aerosol capturing device 800 is inserted onto a collar 802 of an exterior surface 804 of a dental valve 806. The device 800 has an interior surface 808 having a circular indentation 810 that is sized to receive the collar 802 therein. The device 800 has a rear end or valve receiving end 812 that extends past the collar 802. In essence, the device 800 is capable of snapping into place around the collar 802. Although not shown in detail, the device 800 may be configured similar to the devices 500, 600, or 700 with the rear end 812 being capable of fitting around the collar 802 of the dental valve 806. The device 800 has a lumen 814 that is capable of receiving a tip device or straw (not shown).

Figure 16:
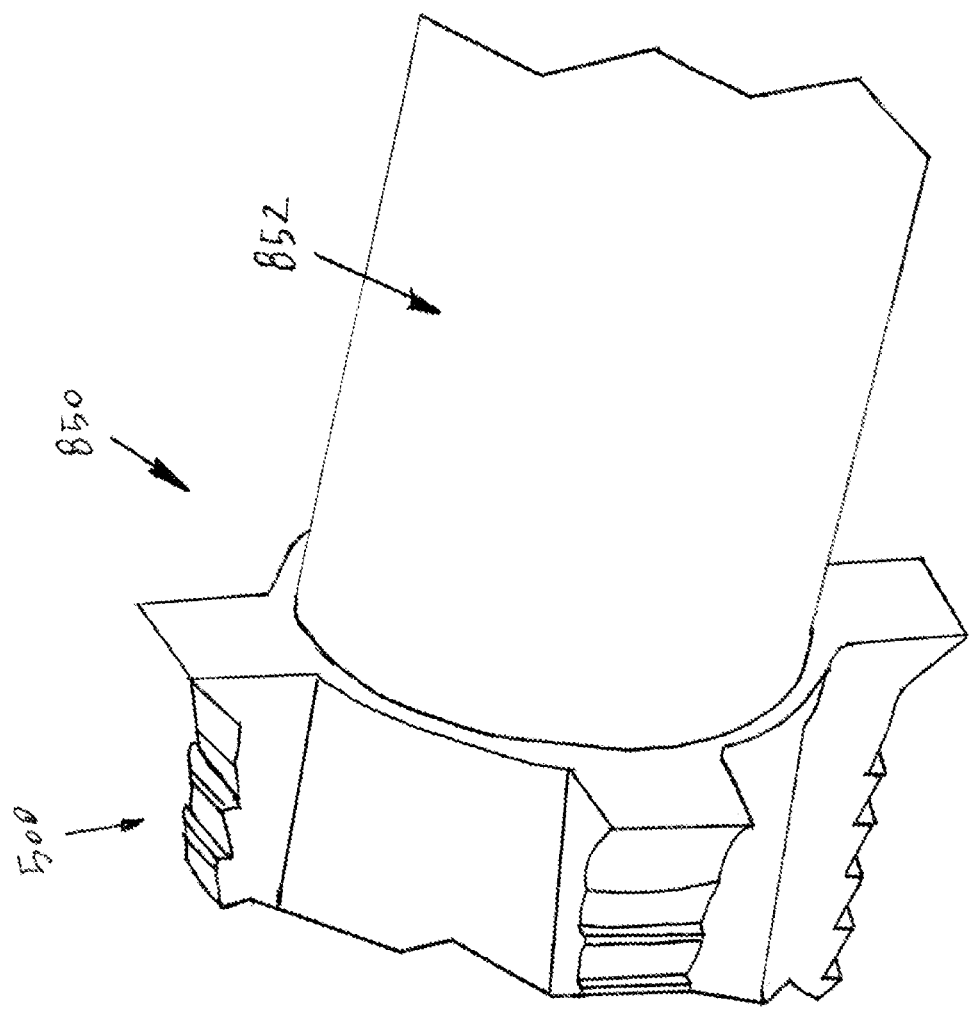
FIG. 16 is a partial perspective view of another embodiment of a disposable dental aerosol device constructed according to the present disclosure.

FIG. 16 illustrates a further embodiment of a disposable aerosol capturing device 850. The device 850 is the device 500 having a tip device or straw 852 formed as a unitary construction. The straw 852 is adapted to be inserted into a mouth of a patient during a dental procedure to remove saliva, blood, water, tooth fragments, metals, and other debris or fluids. The device 500, as has been discussed, is used to remove aerosol generated during the dental procedure. The device 500 and the straw 852 may be molded together or may be two separate pieces that are connected together by various means, such as, by way of example only, welding, adhesive, or frictional engagement. The other devices 10, 100, 200, 300, 400, 600, 700, and 800 may also be constructed in the same manner as the device 850. The device 850 may easily be inserted into a dental valve, such as the dental valve 618, for use in capturing saliva, blood, water, tooth fragments, metals, and other debris or fluids and aerosol during a dental operation.

Figure 17:
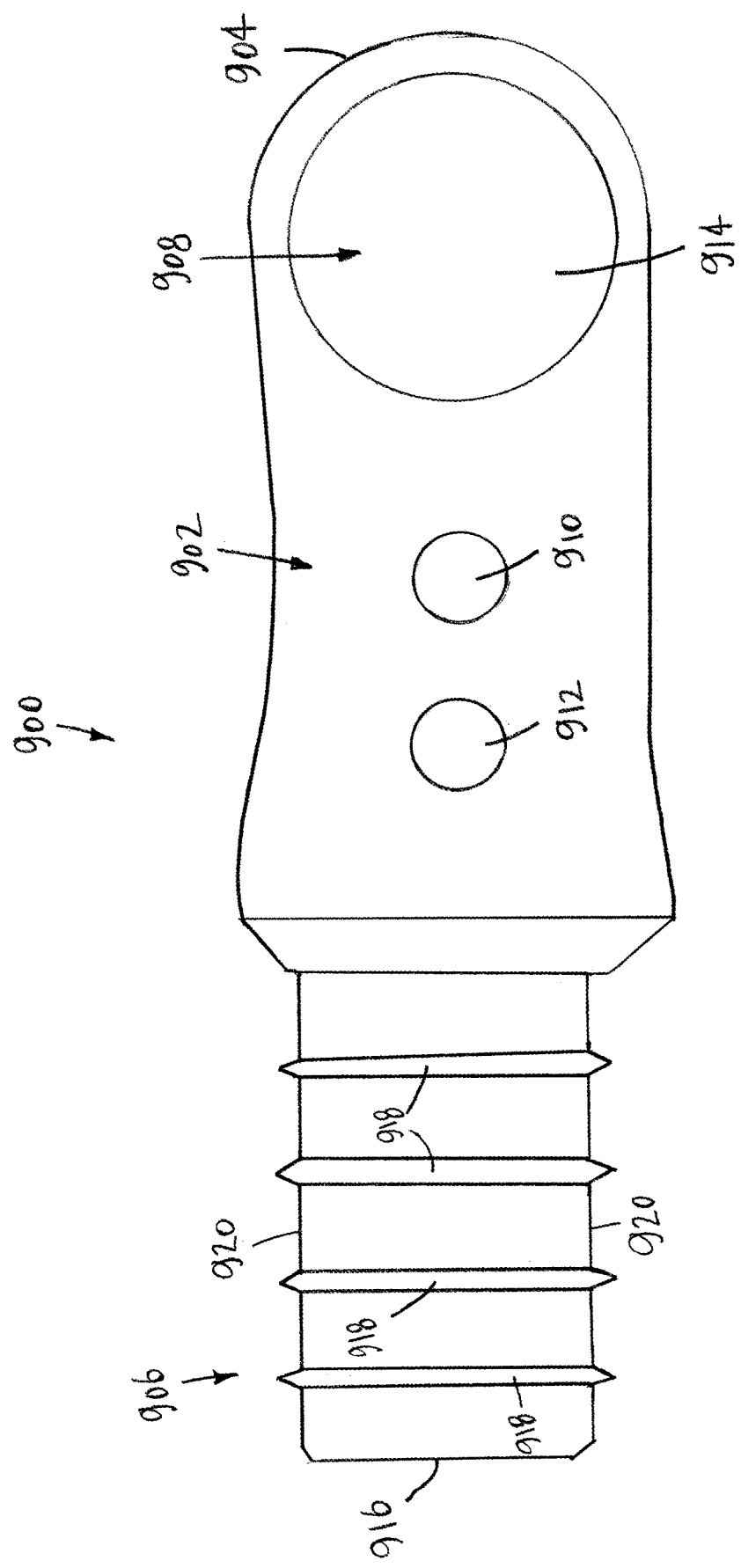
FIG. 17 is a bottom perspective view of another embodiment of a disposable dental aerosol device constructed according to the present disclosure.

With particular reference now to FIG. 17, another embodiment of a disposable dental aerosol device 900 is depicted. The disposable dental aerosol device 900 comprises a body 902 having a front end 904 and a rear end or valve receiving end 906. The front end 904 has an opening 908 that is used to suction aerosol, saliva, debris, or other matter from a mouth of a patient during a dental procedure. The body 902 has a first pressure relief opening 910 and a second pressure relief opening 912. The openings 910 and 912 are used to prevent the opening 908 from becoming locked on or sucked to an interior surface of a mouth, such as a cheek. The opening 910 is adjacent to the opening 908 in the front end 904 and the opening 912 is adjacent to the opening 910. It is further contemplated that the openings 910 and 912 may be side to side and both of the openings 910 and 912 will be adjacent to the opening 908. Although a pair of openings 910 and 912 are shown, it is possible that a single opening will be acceptable or more than two openings may be required. The openings 910 and 912 are shown having the same diameters. However, the diameters may not have to be the same. A lumen 914 is formed from the opening 908 in the front end 904 to an opening 916 in the rear end 906. Further, the openings 910 and 912 are smaller in diameter than the opening 908. Due to the force of vacuum, any aerosol, saliva, debris, or matter will be suctioned from the opening 908 through the lumen 914 and out the opening 916 into a dental valve (not shown). In essence, the flow of material through the lumen 914 is sufficient that nothing flows out of the openings 910 and 912. The rear end 906 has a number of barbed elements 918 that extend away from an exterior surface 920 of the rear end 906. The barbs 918 are used to secure the device 900 within a dental valve, as will be explained in detail further herein.

Figure 18:
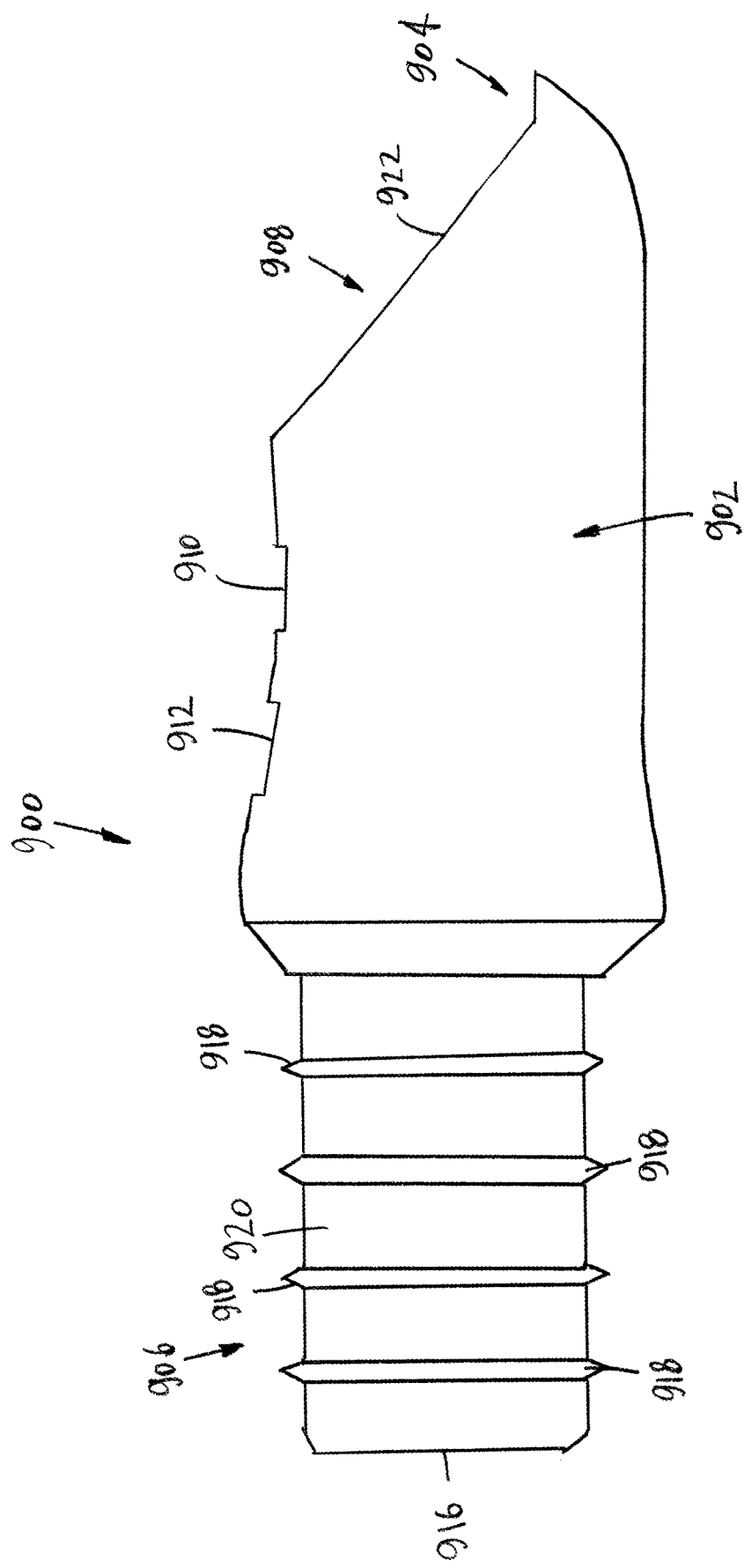
FIG. 18 is a side perspective view of the disposable dental aerosol device shown in FIG. 17.

FIG. 18 shows a side view of the disposable dental aerosol device 900. The device 900 is shown having the body 902, the front end 904, the rear end 906, the opening 908, the relief openings 910 and 912, the opening 916, the barbs 918, and the exterior surface 920. The front end 904 may have a slanted or angled surface 922 that permits the device 900 to be used in a mouth of a patient to remove aerosol generated during a dental procedure. Further, the opening 908 is wide enough to capture aerosol.

Figure 19:
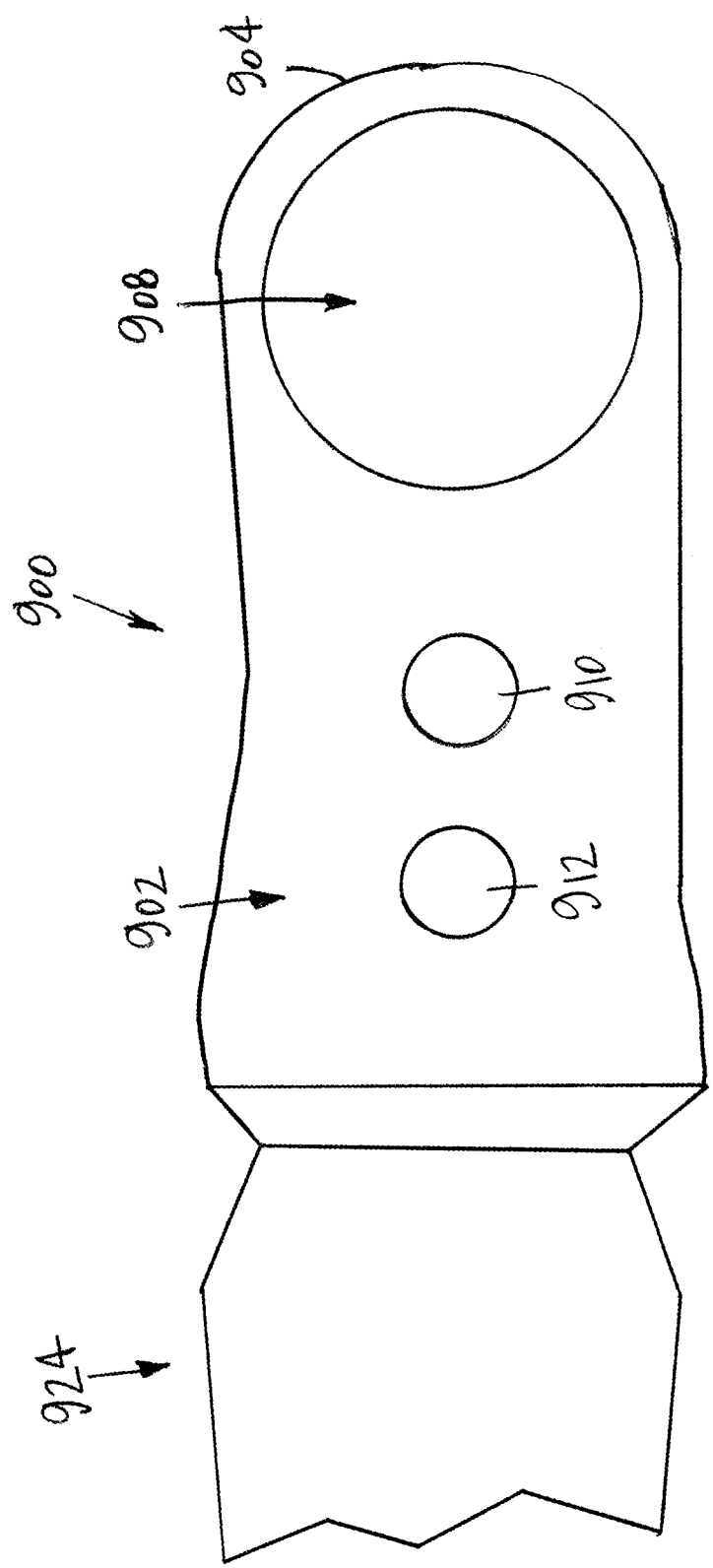
FIG. 19 is a bottom perspective view of the disposable dental aerosol device shown in FIG. 17 being inserted into a dental valve.

Referring now to FIG. 19, the disposable dental aerosol device 900 is shown being inserted into a dental valve 924. As can be appreciated, the barbs 918 are used to engage by friction within the valve 924 to secure the device 900 in place. The body 902, the front end 904, the opening 908, and the relief openings 910 and 912 are also depicted in this particular view.

Figure 20:
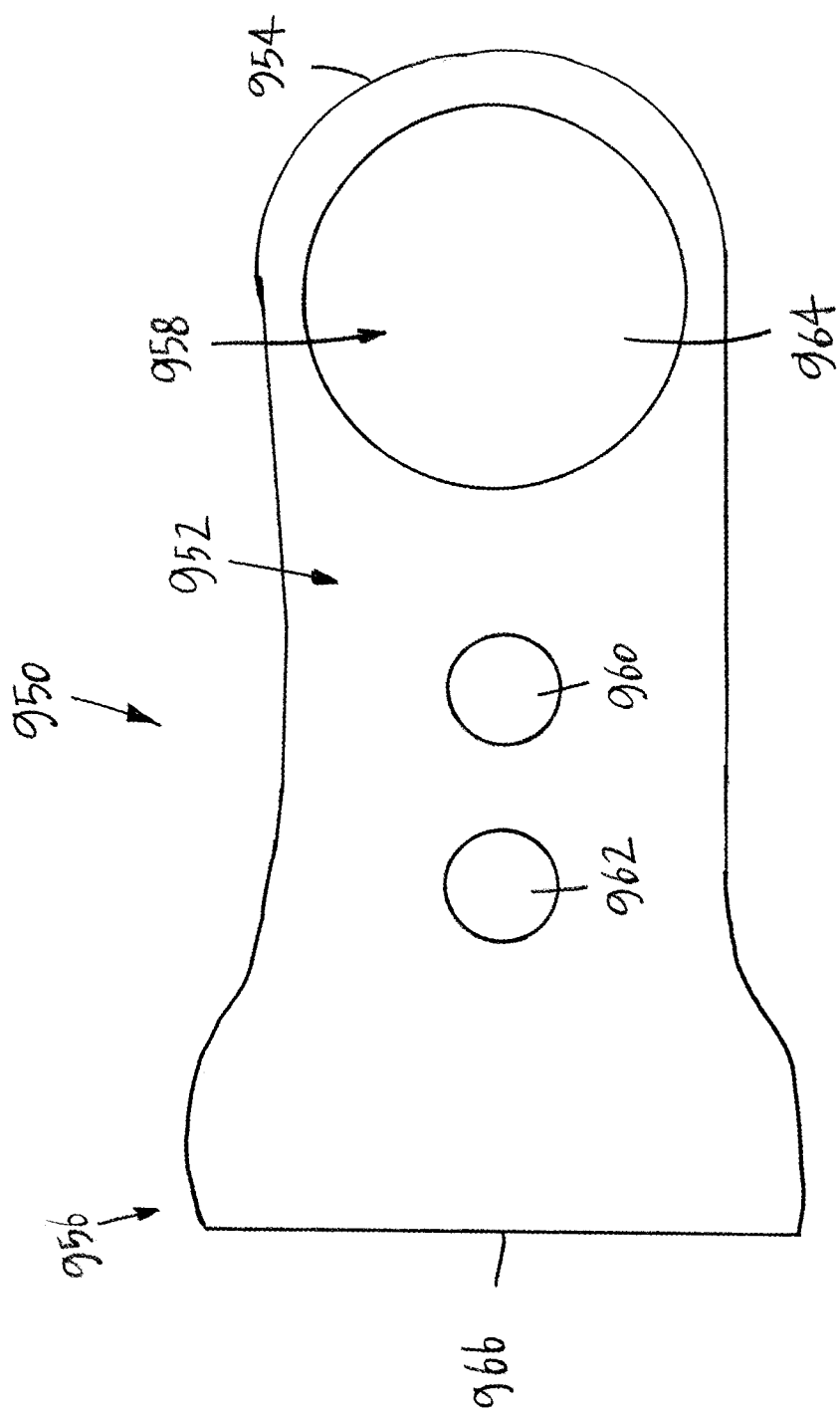
FIG. 20 is a bottom perspective view of another embodiment of a disposable dental aerosol device constructed according to the present disclosure.

FIG. 20 illustrates another embodiment of a disposable dental aerosol device 950. The disposable dental aerosol device 950 comprises a body 952 having a front end 954 and a rear end or valve receiving end 956. The front end 954 has an opening 958 that is used to suction aerosol, saliva, debris, or other matter from a mouth of a patient during a dental procedure. The body 952 has a first pressure relief opening 960 and a second pressure relief opening 962. The openings 960 and 962 are used to prevent the opening 958 from becoming locked on or sucked to an interior surface of a mouth, such as a cheek. The opening 960 is adjacent to the opening 958 in the front end 954 and the opening 962 is adjacent to the opening 960. It is further contemplated that the openings 960 and 962 may be side to side and both of the openings 960 and 962 will be adjacent to the opening 958. Although a pair of openings 960 and 962 are shown, it is possible that a single opening will be acceptable or more than two openings may be required. The openings 960 and 962 are shown having the same diameters. However, the diameters may not have to be the same. A lumen 964 is formed from the opening 958 in the front end 954 to an opening 926 in the rear end 956. Further, the openings 960 and 962 are smaller in diameter than the opening 958. Due to the force of vacuum, any aerosol, saliva, debris, or matter will be suctioned from the opening 958 through the lumen 964 and out the opening 966 into a dental valve (not shown). In essence, the flow of material through the lumen 964 is sufficient that nothing flows out of the openings 960 and 962. The rear end 956 and the opening 966 are wide enough to receive therein a dental valve (not shown).

Figure 21:
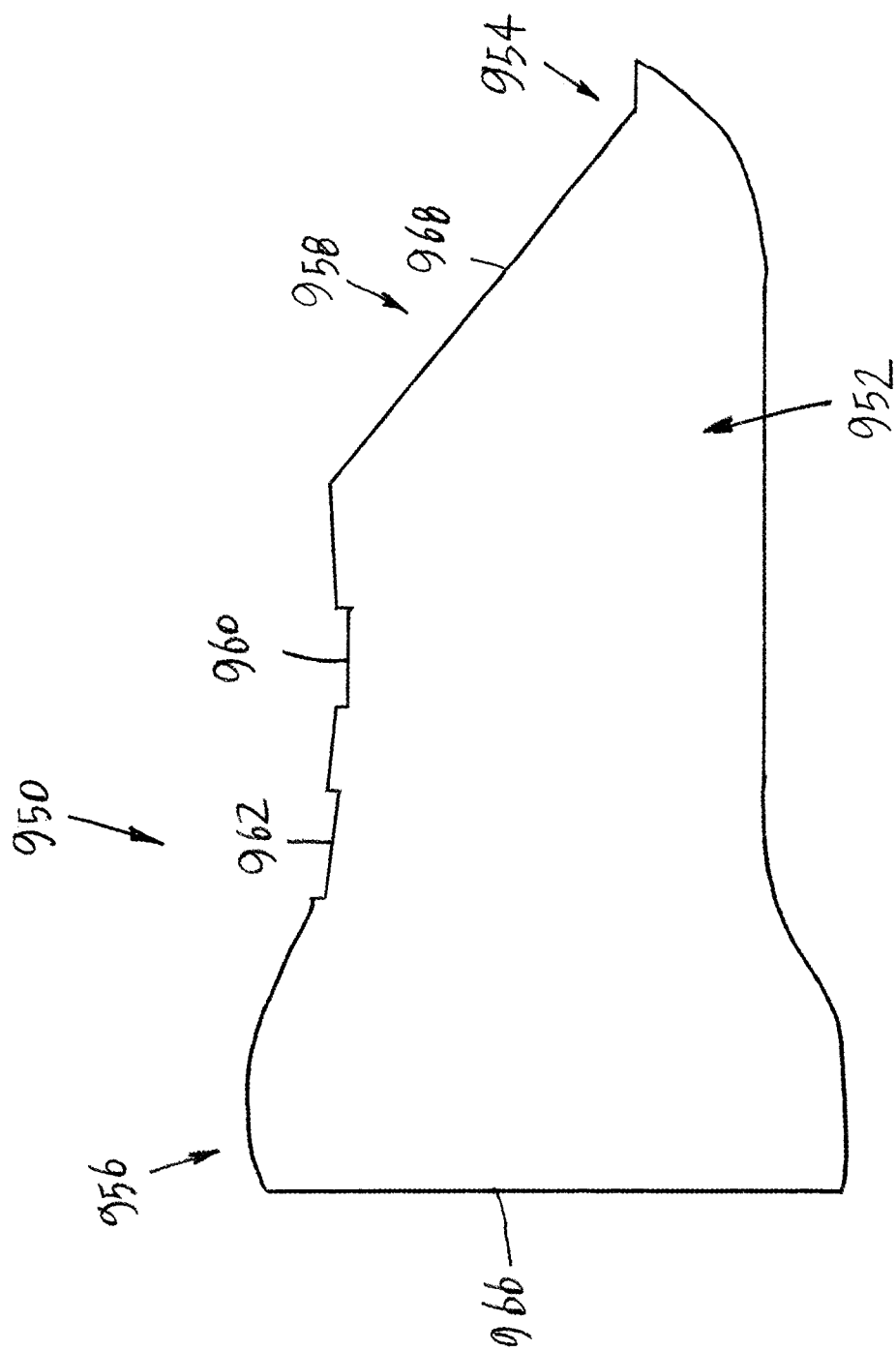
FIG. 21 is a bottom perspective view of the disposable dental aerosol device shown in FIG. 20 being inserted onto a dental valve.

Referring now to FIG. 21, a side view of the disposable dental aerosol device 950 is illustrated. The device 950 is shown having the body 952, the front end 954, the rear end 956, the opening 958, the relief openings 960 and 962, and the opening 966. The front end 954 may have a slanted or angled surface 968 that permits the device 950 to be used in a mouth of a patient to remove aerosol generated during a dental procedure. Further, the opening 958 is wide enough to capture aerosol.

Figure 22:
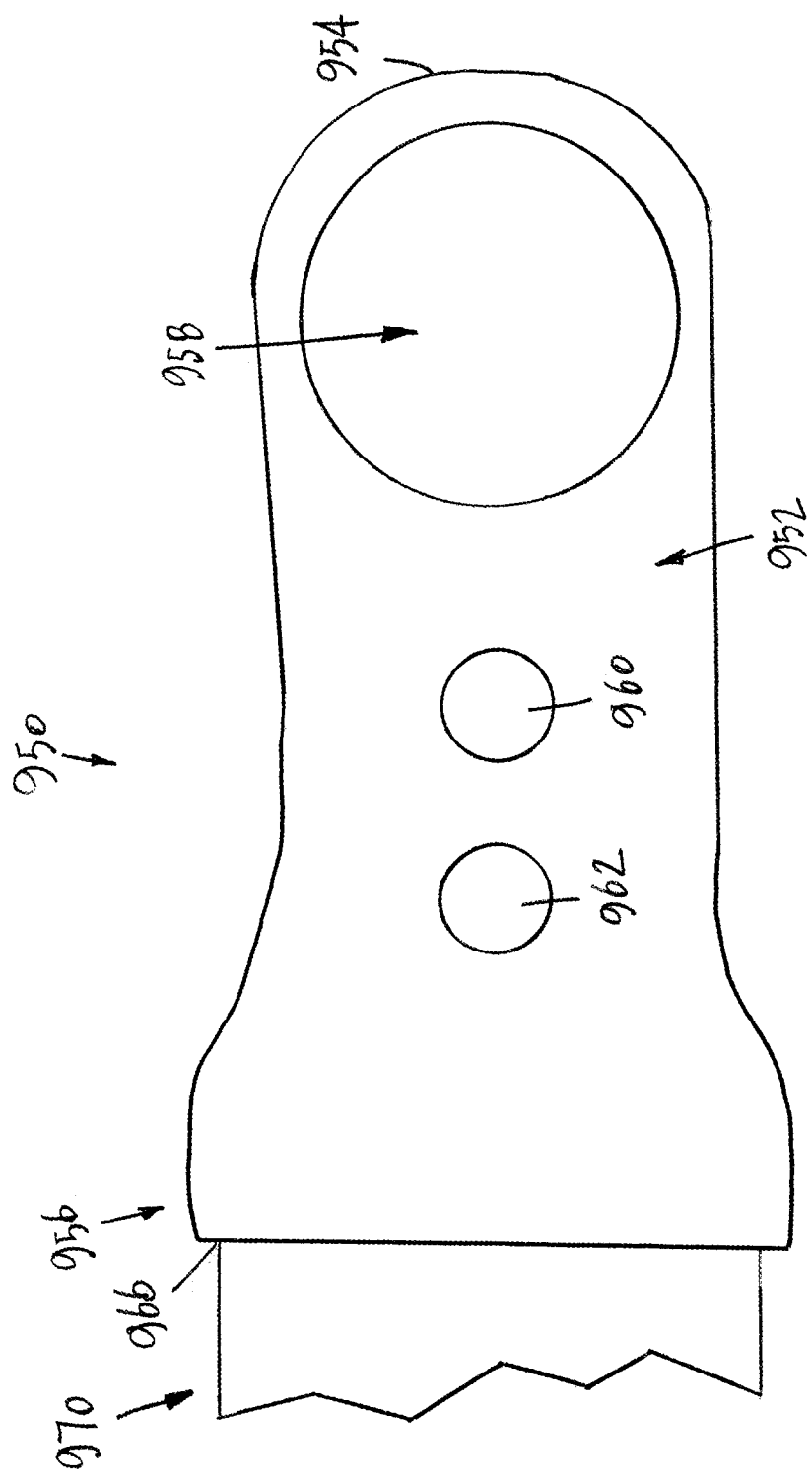
FIG. 22 is a side perspective view of the disposable dental aerosol device shown in FIG. 19 being inserted onto a dental valve.

FIG. 22 shows the disposable dental aerosol device 950 having a dental valve 970 being inserted into the opening 966 in the rear end 956. As can be appreciated, the opening 966 is wide enough to be used to engage by friction the valve 970 within the device 950 to secure the device 950 in place. The body 952, the front end 954, the opening 958, and the relief openings 960 and 962 are also shown in this particular view.

Figure 23:
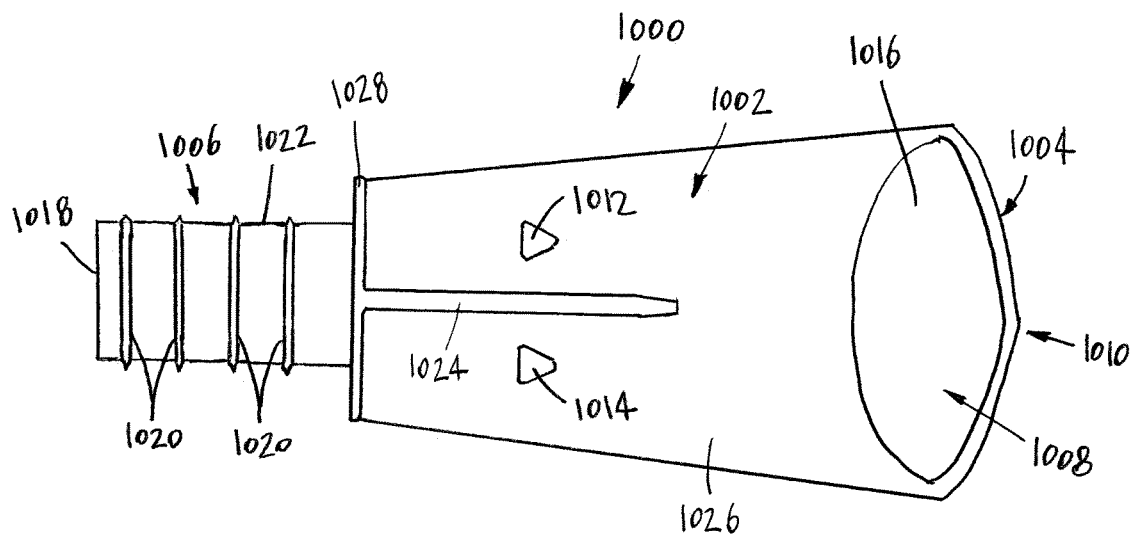
FIG. 23 is a top perspective view of another embodiment of a disposable dental aerosol device constructed according to the present disclosure.

Referring now in particular to FIG. 23, another embodiment of a disposable dental aerosol device 1000 is illustrated. The disposable dental aerosol device 1000 comprises a body 1002 having a front end 1004 and a rear end or valve receiving end 1006. The front end 1004 has an opening 1008 that is used to suction aerosol, saliva, debris, or other matter from a mouth of a patient during a dental procedure. The opening 1008 is also wide enough to capture aerosol, saliva, debris, or other matter from a mouth of a patient during a dental procedure. The front end 1004 also has a cheek retraction lip or a retraction lip portion 1010 that is used for retracting or moving a cheek of a patient during a dental procedure. The body 1002 has a first pressure relief opening 1012 and a second pressure relief opening 1014. The openings 1012 and 1014 are used to prevent the opening 1008 from becoming locked on or sucked to an interior surface of a mouth, such as a cheek. The opening 1012 is parallel to the opening 1014 and both of the openings 1012 and 1014 are adjacent to the opening 1008 in the front end 1004. It is further contemplated that the openings 1012 and 1014 may be offset from each other. Although a pair of openings 1012 and 1014 are shown, it is possible that a single opening will be acceptable or more than two openings may be required. The openings 1012 and 1014 are shown having a generally triangular shape or configuration. However, other shapes or configurations are possible such as, by way of example only, circular, oval, or rectangular. A lumen 1016 is formed from the opening 1008 in the front end 1004 to an opening 1018 in the rear end 1006. Further, the openings 1012 and 1014 are smaller in dimensions than the opening 1008. Due to the force of vacuum, any aerosol, saliva, debris, or matter will be suctioned from the opening 1008 through the lumen 1016 and out the opening 1018 into a dental valve (not shown). In essence, the flow of material through the lumen 1016 is sufficient that nothing flows out of the openings 1012 and 1014. The rear end 1006 has a number of barbed elements 1020 that extend away from an exterior surface 1022 of the rear end 1006. The barbs 1020 are used to secure the device 1000 within a dental valve, as will be explained in detail further herein. The device 1000 also has a tapered reinforcing rib 1024 that extends between the pressure relief openings 1012 and 1014 along an exterior surface 1026 of the body 1002. The device 1000 further has a stop 1028 that is adapted to mate with a dental valve.

Figure 24:
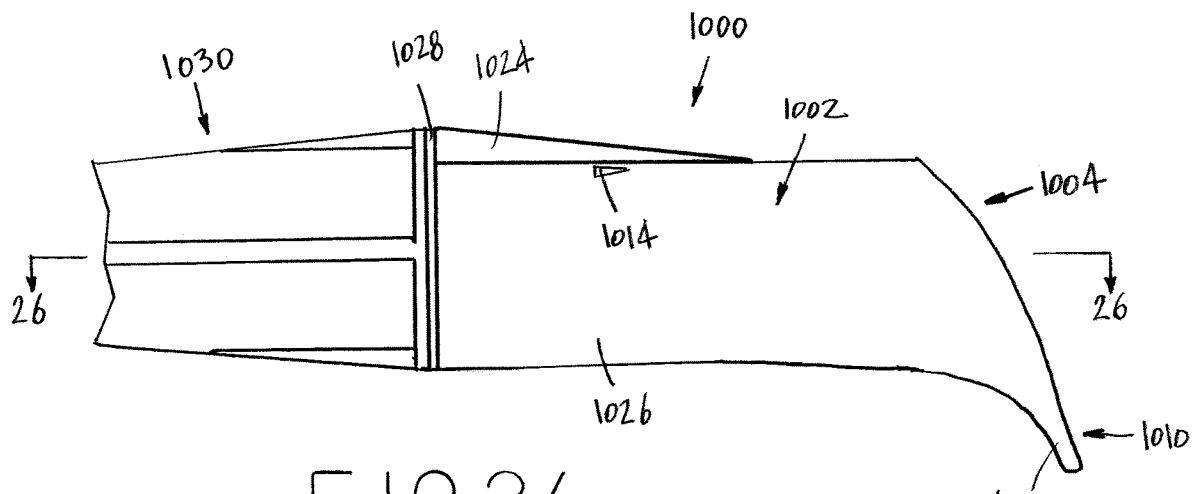
FIG. 24 is a side view of the disposable dental aerosol device shown in FIG. 23 with a valve attached to the device.

FIG. 24 shows a side view of the disposable dental aerosol device 1000 being connected to a dental valve 1030. The dental valve 1030 is only partial illustrated. The device 1000 is shown having the body 1002, the front end 1004, the retraction lip 1010, the pressure relief opening 1014, the tapered rib 1024, the exterior surface 1026, and the stop 1028. The lip 1010 has an angled portion or extension portion 1032 that extends below the exterior surface 1026 of the body 1002. The angled portion 1032 permits the device 1000 to be inserted in a mouth of a patient to retract a cheek of a patient during a dental procedure to provide space for a dentist to operate. The angled portion 1032 is also long enough that the portion 1032 can retract and hold a cheek open during a procedure. The front end 1004 is used to remove aerosol generated during a dental procedure. The stop 1028 is adapted to be adjacent to the dental valve 1030.

Figure 25:
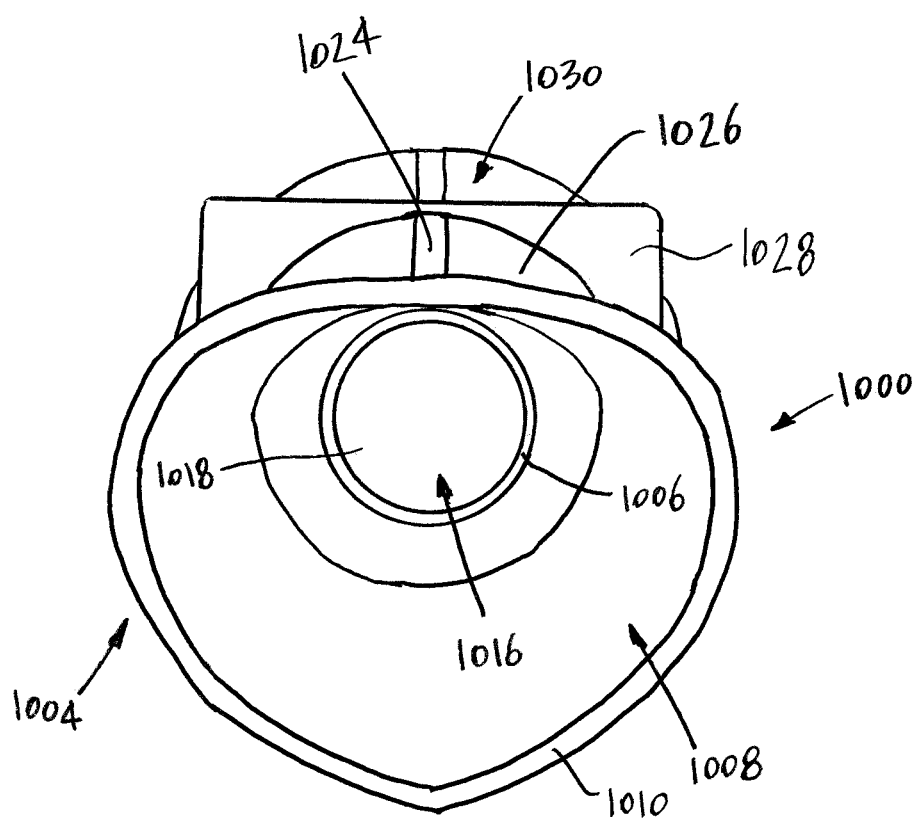
FIG. 25 is a front view of the disposable dental aerosol device shown in FIG. 24.

With reference to FIG. 25, a front view of the device 1000 mated to the dental valve 1030 is shown. The device 1000 has the front end 1004 having the opening 1008 having the retraction lip portion 1010 that is used for retracting or moving a cheek of a patient during a dental procedure. The lumen 1016 is shown extending from the opening 1008 to the opening 1018 of the rear end 1006. In this manner, any aerosol, saliva, debris, or other matter that flows through the lumen 1016 is removed from a mouth of a patient. The tapered rib 1024, the exterior surface 1026, and the stop 1028 are also shown.

Figure 26:
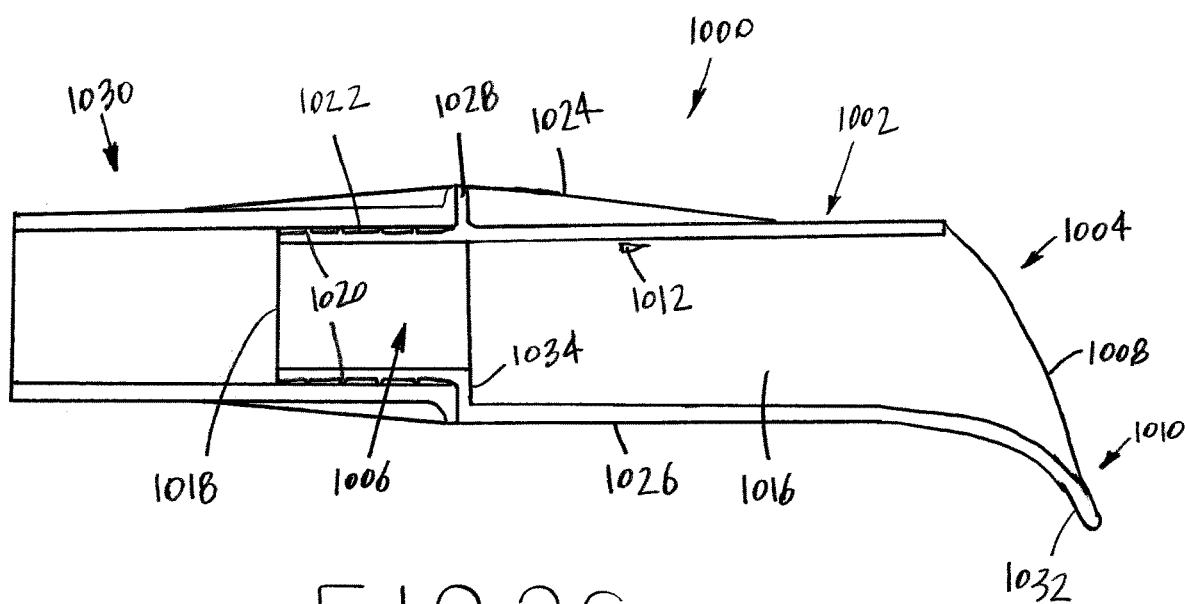
FIG. 26 is a cross-sectional view of the disposable dental aerosol device shown in FIG. 24 taken along the plane of line 26-26.

FIG. 26 depicts a cross-sectional view of the device 1000 connected to the dental valve 1030. The disposable dental aerosol device 1000 comprises the body 1002 having the front end 1004 and the rear end or valve receiving end 1006. The front end 1004 has the opening 1008 that is used to suction aerosol, saliva, debris, or other matter from a mouth of a patient during a dental procedure. The opening 1008 is also wide enough to capture aerosol, saliva, debris, or other matter from a mouth of a patient during a dental procedure. The front end 1004 also has the cheek retraction lip or the retraction lip portion 1010 having the angled portion 1032 that are used for retracting or moving a cheek of a patient during a dental procedure. Only the first pressure relief opening 1012 is depicted in this particular view. The lumen 1016 is between the opening 1008 in the front end 1004 to the opening 1018 in the rear end 1006. Due to the force of vacuum, any aerosol, saliva, debris, or matter will be suctioned from the opening 1008 through the lumen 1016 and out the opening 1018 into the dental valve 1030. The rear end 1006 has the barbed elements 1020 that extend away from the exterior surface 1022 of the rear end 1006. The barbs 1020 are used to secure the device 1000 within the dental valve 1030. The device 1000 also has the tapered reinforcing rib 1024 that extends along the exterior surface 1026 of the body 1002. The device 1000 further has the stop 1028 that is adapted to mate with a dental valve. An interior step 1034 may also be provided within the lumen 1016 to facilitate directing the flow of aerosol and other matter into the dental valve 1030.

The disposable dental aerosol devices 10, 100, 200, 300, 400, 500, 600, 700, 800, 850, 900, 950, and 1000 may be formed of any suitable material such as plastic, paper, polyethylene, and high density polyethylene or any other suitable material that is disposable and recyclable. Any suitable plastic may be used to construct the devices 10, 100, 200, 300, 400, 500, 600, 700, 800, 850, 900, 950, and 1000 so that the devices 10, 100, 200, 300, 400, 500, 600, 700, 800, 850, 900, 950, and 1000 may withstand use in a dental operation or procedure. It is also possible and contemplated to incorporate an antimicrobial agent or chemical in the plastic or to provide a coating of an antimicrobial agent on the plastic to further prevent cross-contamination when using the devices 10, 100, 200, 300, 400, 500, 600, 700, 800, 850, 900, 950, and 1000. As can be appreciated, the antimicrobial agent may be incorporated into any of the components of the devices 10, 100, 200, 300, 400, 500, 600, 700, 800, 850, 900, 950, and 1000. It is further possible that the devices 10, 100, 200, 300, 400, 500, 600, 700, 800, 850, 900, 950, and 1000 may be constructed as part of a dental valve. It is also contemplated that the devices 10, 100, 200, 300, 400, 500, 600, 700, 800, 850, 900, 950, and 1000 may be constructed with a tip device or straw so that the devices 10, 100, 200, 300, 400, 500, 600, 700, 800, 850, 900, 950, and 1000 and the tip device or straw form a unitary construction, as is disclosed with respect to the device 850. The devices 10, 100, 200, 300, 400, 500, 600, 700, 800, 850, 900, 950, and 1000 may also be made with a dental valve and a tip device or straw to form a unitary construction of all of these products.

From all that has been said, it will be clear that there has thus been shown and described herein a disposable dental aerosol device which fulfills the various advantages sought therefore. It will become apparent to those skilled in the art, however, that many changes, modifications, variations, and other uses and applications of the subject disposable dental aerosol device are possible and contemplated. All changes, modifications, variations, and other uses and applications which do not depart from the spirit and scope of the disclosure are deemed to be covered by the disclosure, which is limited only by the claims which follow.

What is claimed is:

1. A disposable dental aerosol device comprises:
a body having an exterior surface, a front end having an angled opening having a retraction lip portion, a rear end having an opening and a circumferential shoulder stop on the exterior surface of the body, a lumen formed between the front end and the rear end, and an interior step within the lumen positioned at the rear end and adjacent to the stop and facing the front end to facilitate directing aerosol and other matter through the lumen and out the opening in the rear end and the lumen having a continuous straight surface from the front end to the opening in the rear end and opposite the interior step, wherein the interior step and retraction lip portion is found on the same side of the body
a first pressure relief opening formed in the body;
a second pressure relief opening formed in the body; and
a tapered rib extending partially along the exterior surface from the stop to before the front end tapering from a high point adjacent to the stop to a low point before the front end with the tapered rib being on a side opposite to the retraction lip portion and between the first pressure relief opening and the second pressure relief opening.

2. The disposable dental aerosol device of claim 1 wherein the rear end has a number of barbs that extend away from the exterior surface.

3. The disposable dental aerosol device of claim 1 wherein the body is constructed of plastic.

4. The disposable dental aerosol device of claim 1 wherein the retraction lip portion has an angled portion that extends below the exterior surface of the body.

5. The disposable dental aerosol device of claim 1 wherein the first pressure relief opening has a triangular shape.

6. The disposable dental aerosol device of claim 1 wherein the second pressure relief opening has a triangular shape.

7. A disposable dental aerosol device comprises:
a body having an exterior surface, a front end having an angled opening having a retraction lip portion, a rear end having an opening and a circumferential shoulder stop on the exterior surface of the body with the rear end for receiving a dental valve, a lumen formed between the front end and the rear end, and an interior step within the lumen positioned at the rear end and adjacent to the stop and facing the front end to facilitate directing aerosol and other matter through the lumen and out the opening in the rear end and the lumen having a continuous straight surface from the front end to the opening in the rear end and opposite the interior step, wherein the interior step and retraction lip portion is found on the same side of the body
a first pressure relief opening formed in the body; and
a second pressure relief opening formed in the body; and
a tapered rib extending partially along the exterior surface from the stop to before the front end tapering from a high point adjacent to the stop to a low point before the front end with the tapered rib being on a side opposite to the retraction lip portion and between the first pressure relief opening and the second pressure relief opening; and wherein the retraction lip portion has an angled portion that extends below the exterior surface of the body.

8. The disposable dental aerosol device of claim 7 wherein the body is constructed of plastic.

9. The disposable dental aerosol device of claim 7 wherein the first pressure relief opening has a triangular shape.

10. The disposable dental aerosol device of claim 7 wherein the rear end has a barb that extends away from the exterior surface.

11. The disposable dental aerosol device of claim 7 wherein the second pressure relief opening has a triangular shape.

12. A disposable dental aerosol device comprises:
a body having an exterior surface and an interior surface, a front end having an angled opening having a retraction lip portion, a rear end having an opening and a circumferential shoulder stop on the exterior surface of the body, an exterior side of the exterior surface opposite to the retraction lip portion, and a lumen formed between the front end and the rear end;
a first pressure relief opening formed through the body from the exterior surface to the interior surface and on the exterior side opposite to the retraction lip portion;
a second pressure relief opening formed through the body from the exterior surface to the interior surface and on the exterior side opposite to the retraction lip portion;
an interior step within the lumen positioned at the rear end and adjacent to the stop and facing the front end to facilitate directing aerosol and other matter through the lumen and out the opening in the rear end;
the lumen having a continuous straight surface from the front end to the opening in the rear end and opposite the interior step, wherein the interior step and retraction lip portion is found on the same side; and
a tapered rib extending partially along the exterior surface from the stop to before the front end tapering from a high point adjacent to the stop to a low point before the front end with the tapered rib being on the exterior side opposite to the retraction lip portion and between the first pressure relief opening and the second pressure relief opening; and wherein the first pressure relief opening has a triangular shape.

13. The disposable dental aerosol device of claim 12 wherein the retraction lip portion has an angled portion that extends below the exterior surface of the body.

14. The disposable dental aerosol device of claim 12 wherein the rear end has a barb that extends away from the exterior surface.

15. The disposable dental aerosol device of claim 12 wherein the second pressure relief opening has a triangular shape.

16. The disposable dental aerosol device of claim 12 wherein the body is constructed of plastic.

17. The disposable dental aerosol device of claim 12 wherein the rear end has a number of barbs that extend away from the exterior surface.

18. The disposable dental aerosol device of claim 12 wherein the first pressure relief opening has a triangular shape and the second pressure relief opening has a triangular shape.

* * * * *